United States Patent [19]
Usui

[11] Patent Number: 6,097,896
[45] Date of Patent: Aug. 1, 2000

[54] MOTION COMPENSATION SYSTEM HAVING MOTION DETECTION SIGNAL CORRECTION

[75] Inventor: Kazutoshi Usui, Kawasaki, Japan

[73] Assignee: Nikon Corporation, Tokyo, Japan

[21] Appl. No.: 09/139,771

[22] Filed: Aug. 25, 1998

[30] Foreign Application Priority Data

Aug. 25, 1997 [JP] Japan ..................................... 9-227973
Aug. 25, 1997 [JP] Japan ..................................... 9-227994

[51] Int. Cl.$^7$ ............................ G03B 17/00; G02B 27/64
[52] U.S. Cl. ............................................. 396/55; 359/554
[58] Field of Search ................................... 396/52, 53, 55; 348/208; 359/554, 555, 556, 557

[56] References Cited

U.S. PATENT DOCUMENTS

| | | | |
|---|---|---|---|
| 5,745,799 | 4/1998 | Morofuji | 396/55 |
| 5,809,346 | 9/1998 | Fujisaki | 396/55 |
| 5,845,156 | 12/1998 | Onuki | 396/55 X |

Primary Examiner—W. B. Perkey

[57] ABSTRACT

A motion compensation device to compensate for motion of an optical system causing image blur. The motion compensation device includes a motion detection unit to detect motion causing image blur, a motion compensation lens which is driven to correct image blur and a motion detection signal correction unit to correct a motion detection signal output by the motion detection unit. The motion detection signal correction unit includes a position bias table to correct a target position signal which drives the motion compensation lens to a target position, and a speed bias table to correct the drive speed of the motion compensation lens. The position bias table causes the motion compensation lens to be driven at the center of its range of movement to prevent a sense of physical disorder during panning or during a composition change. Moreover, the speed bias table causes the motion compensation lens to be driven to a center of its range of movement a predetermined time after introduction of a power supply to correct the drive speed of the motion compensation lens to obtain an image with little distortion.

27 Claims, 26 Drawing Sheets

MOTION COMPENSATION SYSTEM HAVING MOTION DETECTION SIGNAL CORRECTION

CROSS-REFERENCE TO RELATED APPLICATIONS

This application is based upon and claims priority of Japanese Patent Application Nos. 09-227973 filed Aug. 25, 1997 and 09-227994 filed Aug. 25, 1997, the contents being incorporated herein by reference.

BACKGROUND OF THE INVENTION

1. Field of the Invention

The present invention relates to a motion compensation device which compensates for motion causing image blur in an optical device, such as a camera, video camera, or binoculars, and, more particularly, the present invention relates to a motion compensation device having a motion detection signal correction unit to correct a motion detection signal according to a vibration state detected by a motion detection unit.

2. Description of the Related Art

A motion compensation device is known which compensates for motion of an optical system to suppress blur of an image formed by the optical system. The known motion compensation device detects motion causing image blur with an angular velocity sensor. A motion compensation optical system, which constitutes either a portion or all of a photographic optical system, is driven according to the detected motion in a direction to negate the motion causing image blur, thereby compensating for the motion causing blurring of the image. The motion of a camera which causes image blur has six (6) degrees of freedom: three (3) degrees of freedom of pitch, yaw and roll motion in the x, y and z axis directions; and three (3) degrees of freedom of translational motion. A known motion compensation device normally compensates for motion causing image blur with respect to motion having two (2) degrees of freedom consisting of pitch and yaw.

In a camera, there exist two main kinds of motion resulting in image blur which affect the camera. One type of motion is so-called hand shake, unintended by the photographer. A second type of motion is motion intended by the photographer, for example, a panning action or a composition change. In the case of a panning action intended by the photographer, when the camera following a subject begins its panning motion, a motion compensation device performs a motion compensation action at the commencement of panning motion because it cannot distinguish panning motion from hand shake. Because of the inability of the known motion compensation device to distinguish panning motion from hand shake, the phenomenon arises that an image in the camera viewfinder does not move, regardless of whether the camera vibrates horizontally.

Similarly, when the photographer initiates a composition change, the motion compensation device cannot distinguish between a composition change action and hand shake, and the motion compensation optical system is driven after the beginning of the composition change action. As a result, the image in the viewfinder does not move, regardless of whether the photographer moves the camera. Moreover, when the motion compensation optical system is driven as far as the movement range limit, motion compensation action becomes impossible, and movement of the image in the viewfinder does not occur until the stage at which the motion compensation optical system is driven to the movement range limit. The above-described phenomenon is highly sensitive to the photographer as the width of the motion compensation range widens, and a problem occurs in that it becomes difficult for the photographer to make intended changes on the viewfinder. On the other hand, when the motion compensation range is narrowed in order to avoid this phenomenon, a problem arises in that it is difficult to confirm the motion compensation effect in the viewfinder.

Moreover, because of size and cost aspects, the angular velocity sensor used for detecting motion is usually a vibration gyro type of angular velocity sensor. However, the structure of vibration gyro types of angular velocity sensors results in a very unstable output directly after a power supply is introduced. Moreover, because the frequency of hand shake is normally 1–15 Hz, a low pass filter of 1 Hz or below is used when calculating a central value (a value of $\omega=0$ (zero)) of the output signal (angular velocity signal) $\omega$ of the angular velocity sensor. Because of this, the detection of the angular velocity signal $\omega$ is delayed corresponding to the frequency.

When photography is performed after the introduction of a power supply, the calculation of the value of $\omega=0$ is not in time, and when the motion compensation device makes a correction, the drift of the angular velocity sensor is mistaken for a signal indicating motion causing image blur. As a result, even when photographing a stationary subject, it is possible that the photographic result is a photograph of a moving image as a result of the effect of the mistaken recognition of the drift of the angular velocity sensor.

SUMMARY OF THE INVENTION

It is an object of the present invention to provide a motion compensation device which can perform framing without the occurrence of a sense of physical disorder on the part of the photographer.

It is another object of the present invention to provide a motion compensation device which can obtain an effect of motion compensation even directly after the introduction of a power supply.

Objects and advantages of the present invention are achieved in accordance with a first preferred embodiment of the present invention with a motion compensation device comprising a motion detection unit to detect motion causing image blur and to output a motion detection signal representing the detected motion; a motion compensation optical system to correct the motion causing image blur; a drive unit to drive the motion compensation optical system; and a motion detection signal correction unit to correct the motion detection signal corresponding to the vibration state of the motion detection unit.

In accordance with the first preferred embodiment of the present invention, the motion detection signal correction unit corrects a drive position of the motion compensation optical system.

In accordance with the first preferred embodiment of the present invention, the motion detection signal correction unit corrects a drive velocity of the motion compensation optical system.

In accordance with the first preferred embodiment of the invention, the motion compensation device may further comprise a control unit to perform drive control of the drive unit based on the motion detection signal corrected by the motion detection signal correction unit, wherein the control unit controls the drive unit to drive the motion compensation optical system to a center, or a neighborhood of the center, of a drive range of the motion compensation optical system when an amount of correction of the motion detection signal is large.

In accordance with the first preferred embodiment of the invention, an amount of correction of the motion detection signal by the motion detection signal correction unit at the time of a photographic operation is small.

In accordance with the first preferred embodiment of the invention, the motion compensation device may further comprise a comparison unit to compare the motion detection signal and a set value, wherein the motion detection signal correction unit makes an amount of correction of the motion detection signal small based on a comparison result of the comparison unit.

In accordance with the first preferred embodiment of the invention, the set value may comprise a maximum set value and a minimum set value, and when the motion detection signal exceeds the maximum set value within a set time, and is less than the minimum set value, the motion detection signal correction unit makes the correction amount small. At this time, the motion detection signal correction unit resets the correction amount, after the correction amount is changed, and the motion detection signal does not exceed the maximum set value within the set time, and the motion detection signal is not below the minimum set value.

Objects and advantages of the present invention are achieved in accordance with a second preferred embodiment of the present invention with a motion compensation device comprising a motion detection unit to detect motion causing image blur and to output a motion detection signal; a motion compensation optical system to compensate for the motion causing image blur; a drive unit to drive the motion compensation optical system; a position detection unit to detect a position of the motion compensation optical system, and to output a position detection signal; a target drive calculating unit to calculate a target drive position of the motion compensation optical system based on the motion detection signal, and to output a target position signal; and a target position signal correction unit to correct the target position signal based on the position detection signal and a vibration state detected by the motion detection unit.

In accordance with the second preferred embodiment of the present invention, the target position signal correction unit corrects a drive position detected by the motion compensation optical system.

In accordance with the second preferred embodiment of the present invention, the motion compensation device may further comprise a control unit to control the drive of the drive unit based on the target position signal corrected by the target position signal correction unit, and when the amount of correction of the target position correction is large, the control unit controls drive of the motion compensation optical system by the drive unit to a center, or a neighborhood of the center, of the drive range of the motion compensation optical system.

In accordance with the second preferred embodiment of the present invention, the target position signal correction unit makes the amount of correction of the target position signal small during a photographic operation.

In accordance with the second preferred embodiment of the present invention, the target position signal correction unit includes a comparison unit to compare the target position signal and a set value, and makes the amount of correction of the target position signal small based on the comparison result of the comparison unit.

In accordance with the second preferred embodiment of the present invention, the set value comprises a maximum set value and a minimum set value, and the target position signal correction unit makes the amount of correction small when the target position signal exceeds the maximum set value within the set time, and is less than the minimum value. At this time, the target position signal correction unit resets the correction amount, after changing the correction amount, when the target position signal does not exceed the maximum set value within the set time and is not less than the minimum set value.

Objects and advantages of the present invention are achieved in accordance with a third preferred embodiment of the present invention with a motion compensation device, comprising: a motion detection unit to detect motion causing image blurring and to output a motion detection signal; a motion compensation optical system to compensate for the motion causing image blur, a drive commencement signal generating unit to generate a drive commencement signal to drive the motion compensation optical system; a drive unit to drive the motion compensation optical system based on the drive commencement signal; and a motion detection signal correction unit to correct the motion detection signal a predetermined time from the generation of the drive commencement signal.

In accordance with the third preferred embodiment of the present invention, the motion detection signal correction unit corrects a drive position of the motion compensation optical system.

In accordance with the third preferred embodiment of the present invention, the motion detection signal correction unit corrects a drive speed of the motion compensation optical system.

In accordance with the third preferred embodiment of the present invention, the motion compensation device may further comprise a control unit to control the drive unit, based on the motion detection signal corrected by the motion detection signal correction unit, wherein the control unit controls driving of the motion compensation optical system by the drive unit to a center, or a neighborhood of the center, of the drive range of the motion compensation optical system, a predetermined time from the generation of the drive commencement signal.

In accordance with the third preferred embodiment of the present invention, the motion detection signal correction unit maintains an amount of correction of the motion detection signal at a correction amount when the motion compensation optical system is at a center or a neighborhood of the center of a movement range of the motion compensation optical system.

In accordance with the third preferred embodiment of the present invention, the motion detection signal correction unit does not correct the motion detection signal during a photographic operation.

In accordance with the third preferred embodiment of the present invention, the motion compensation device further comprises a gain varying unit to vary the gain of the motion detection signal, wherein the gain varying unit makes the gain of the motion detection signal small between a predetermined time from the generation of the drive commencement signal.

In accordance with the third preferred embodiment of the present invention, the gain varying unit resets the gain of the motion detection unit at a time of a photographic operation.

Objects and advantages of the present invention are achieved in accordance with a fourth preferred embodiment of the present invention with a motion compensation device comprising a motion detection unit to detect motion causing image blur and to output a motion detection signal; a motion compensation optical system to compensate for the motion causing image blurring; a drive commencement signal generation unit to generate a drive commencement signal to drive the motion compensation optical system; a drive unit to drive the motion compensation optical system based on the drive commencement signal; a position detection unit to detect a position of the motion compensation optical system and to output a position detection signal; a target drive position calculation unit to calculate a target drive position of the motion compensation optical system based on the motion detection signal, and to output a target position signal; and a target position signal correction unit to correct the target position signal at a predetermined time from the generation of the drive commencement signal based on the position detection signal.

In accordance with the fourth preferred embodiment of the present invention, the target position signal correction unit corrects a drive position of the motion compensation optical system.

In accordance with the fourth preferred embodiment of the present invention, the motion compensation device may further comprise a control unit to control the drive unit based on the target position signal corrected by the target position signal correction unit, wherein the control unit, at a predetermined time from the generation of the drive commencement signal, controls driving of the motion compensation optical system by the drive unit to a center or to a neighborhood of the center of a range of movement of the motion compensation optical system.

In accordance with the fourth preferred embodiment of the present invention, the target position signal correction unit does not correct the motion detection signal during a photographic operation.

In accordance with the fourth preferred embodiment of the present invention, the motion compensation device may further comprise a gain varying unit to vary the gain of the motion detection signal, wherein the gain varying unit makes the gain of the motion detection signal small between a predetermined time from the generation of the drive commencement signal.

In accordance with the fourth preferred embodiment of the present invention, the gain varying unit resets the gain of the motion detection unit during a photographic operation.

Objects and advantages of the present invention are achieved in accordance with a fifth preferred embodiment of the present invention with a motion compensation device comprising a motion detection unit to detect motion causing image blur and to output a motion detection signal; a motion compensation optical system to compensate for the motion causing image blur; a drive commencement signal generation unit to generate a drive commencement signal to drive the motion compensation optical system; a drive unit to drive the motion compensation optical system based on the drive commencement signal; a target drive position calculation unit to calculate a target drive position of the motion compensation optical system based on the motion detection signal, and to output a target position signal; and a target position signal correction unit to correct the target position signal based on the position detection signal at a predetermined time from the generation of the drive commencement signal.

In accordance with the fifth preferred embodiment of the present invention, the target position signal correction unit corrects a drive position of the motion compensation optical system.

In accordance with the fifth preferred embodiment of the present invention, the motion compensation device may further comprise a control unit to control the drive unit based on the target position signal corrected by the target position signal correction unit, wherein the control unit controls driving of the motion compensation optical system by the drive unit to a center or a neighborhood of the center of a range of movement of the motion compensation optical system at a predetermined time from the generation of the drive commencement signal.

In accordance with the fifth preferred embodiment of the present invention, the target position signal correction unit does not correct the motion detection signal during a photographic operation.

In accordance with the fifth preferred embodiment of the present invention, the motion detection device may further comprise a gain varying unit to vary the gain of the motion detection signal, wherein the gain varying unit makes the gain of the motion detection signal small between a predetermined time from the generation of the drive commencement signal.

In accordance with the fifth preferred embodiment of the present invention, the gain varying unit resets the gain of the motion detection unit during a photographic operation.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
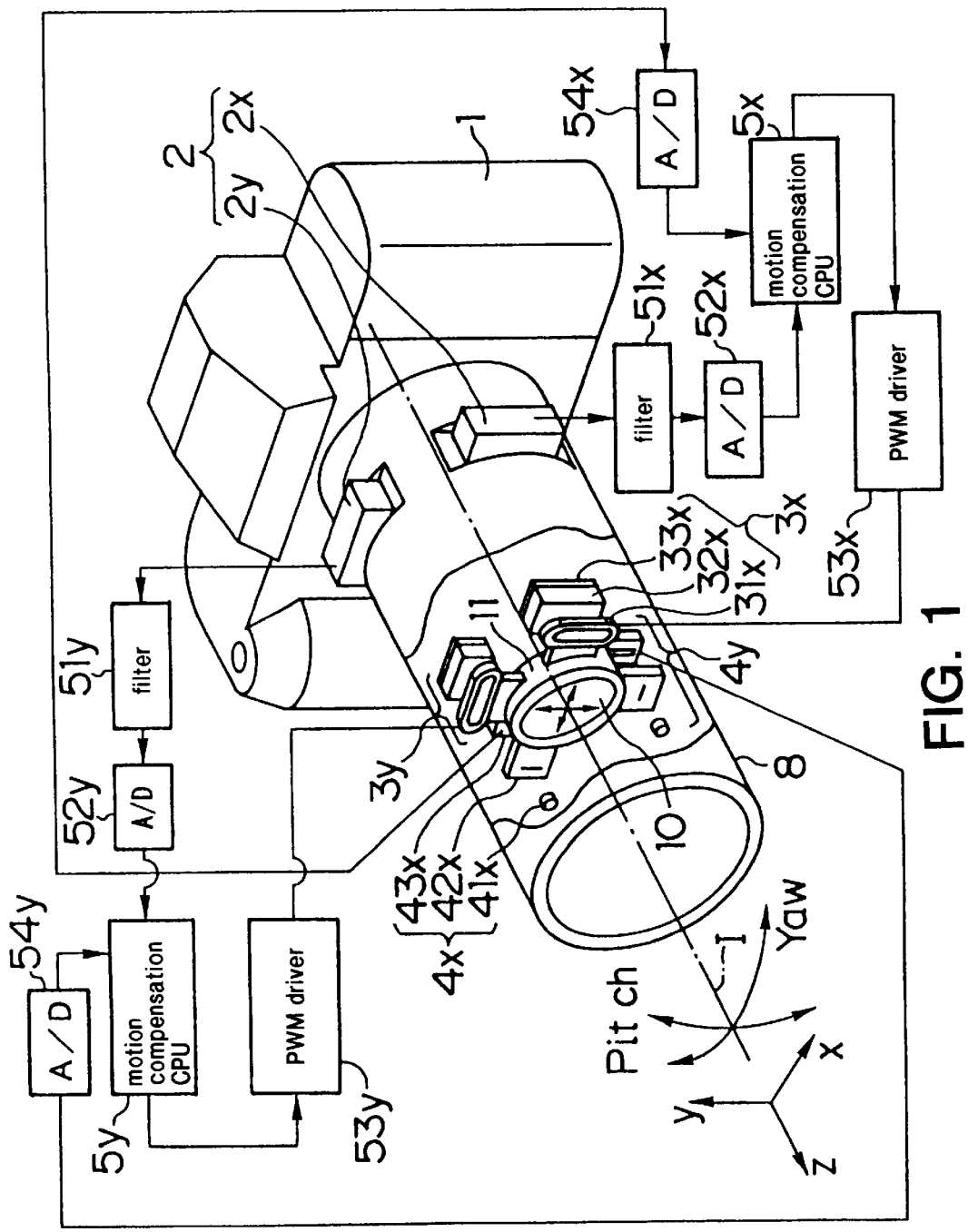
FIG. 1 is an oblique diagram showing a motion compensation device in a single lens reflex camera in accordance with a first embodiment of the present invention.

Reference will now be made in detail to the preferred embodiments of the present invention, examples of which are illustrated in the accompanying drawings, wherein like reference numerals refer to like elements throughout.

The motion compensation device in accordance with preferred embodiments of the present invention is described hereinbelow as part of a single lens reflex camera. However, the motion compensation device is not limited to use with a single lens reflex camera, and may be used with other types of cameras.

Figure 2:
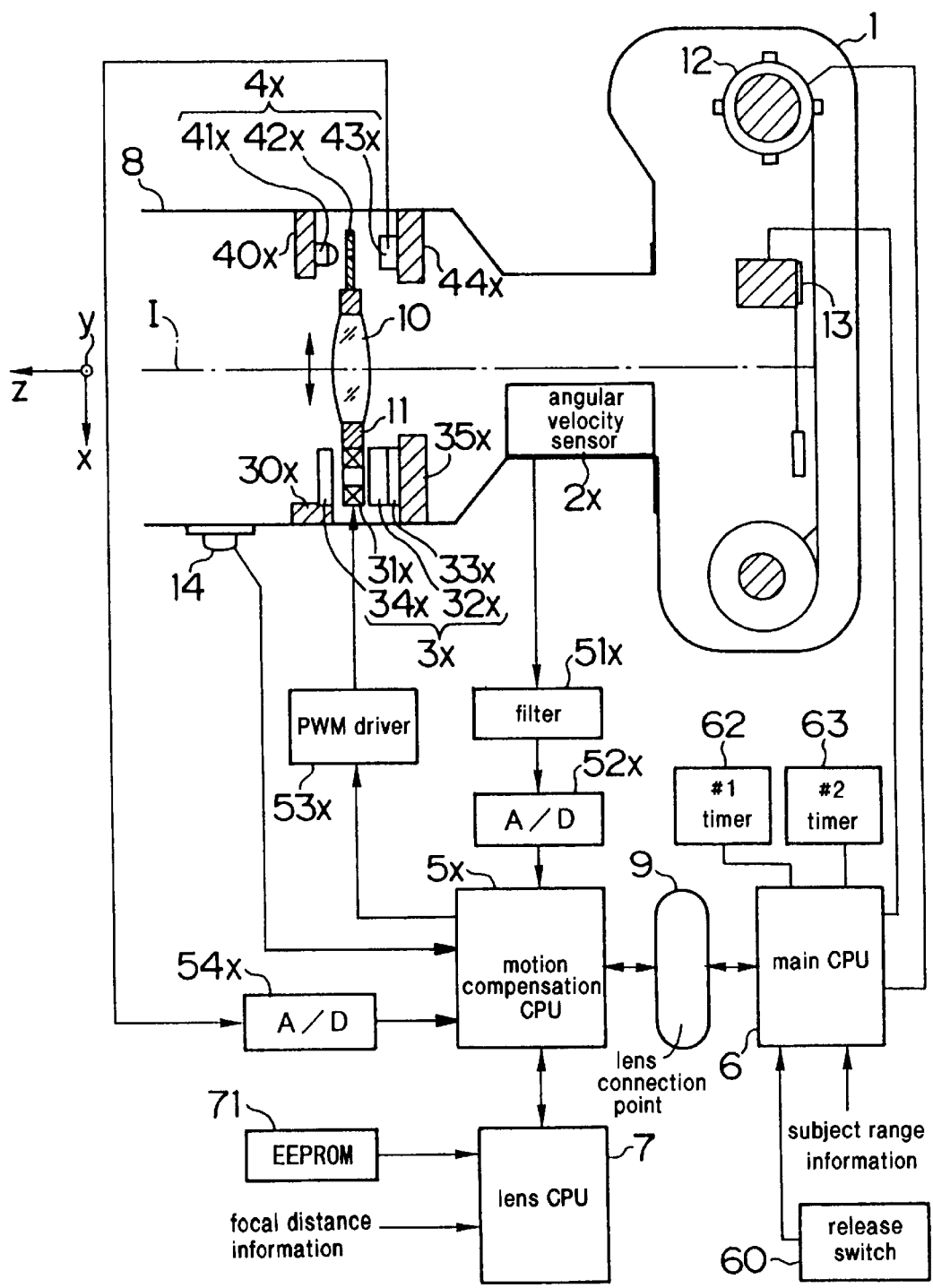
FIG. 2 is a block diagram of the motion compensation device in accordance with the first embodiment of the present invention.

FIG. 1 is an oblique diagram of a motion compensation device in a single lens reflex camera in accordance with a first embodiment of the present invention. FIG. 2 is a block diagram of the motion compensation device in accordance with the first embodiment of the present invention.

As shown in FIGS. 1 and 2, an interchangeable lens 8 is detachably installed on a camera body 1. The interchangeable lens 8 includes angular velocity sensors 2x, 2y, a motion compensation lens 10, voice coil motors (VCMs) 3x, 3y, and position detection units 4x, 4y.

The angular velocity sensors 2x, 2y monitor motion causing image blur occurring in the camera body 1 and the interchangeable lens 8. The angular velocity sensors 2x, 2y are normally piezoelectric vibration type angular velocity sensors which detect Coriolis force occurring as a result of rotation. As shown in FIG. 1, the angular velocity sensor 2x is a sensor to detect the angular velocity of rotation around the y-axis when yawing motion of the camera body 1 and interchangeable lens 8 occurs. The angular velocity sensor 2y is a sensor to detect the angular velocity of rotation around the x-axis when pitching motion of the camera body 1 and interchangeable lens 8 occurs. Furthermore, the angular velocity sensors 2x, 2y have the same structure, and the angular velocity sensor 2y is omitted from FIG. 2. The angular velocity sensor 2x outputs angular velocity information (i.e., an angular velocity signal) to a filter 51x which cuts off high frequency region noise components and a direct current (DC) component.

Motion compensation CPUs 5x, 5y are, for example, central processing units which calculate target drive position information according to an amount of motion compensation to As drive the motion compensation lens 10 in a direction negating the amount of motion causing image blur. The motion compensation CPUs 5x, 5y instruct pulse width modulation (PWM) drivers 53x, 53y to drive, or to stop driving, the VCMs 3x, 3y. The motion compensation CPUs 5x, 5y calculate target drive position information to drive the motion compensation lens 10 to a target position based on angular velocity signals and subject range information transmitted from a main CPU 6, and focal distance information and lens data transmitted from a lens CPU 7.

Moreover, the motion compensation CPUs 5x, 5y drive control the VCMs 3x, 3y based on position detection information and target drive position information output by the position detection units 4x, 4y. A motion compensation start switch 14 is switched on to start the motion compensation device, and is connected to the motion compensation CPUs 5x, 5y. The motion compensation CPUs 5x, 5y respectively acquire digitized (quantized) angular velocity signals via A/D converters 52x, 52y through the filters 51x, 51y. The motion compensation CPUs 5x, 5y respectively output calculated target drive position information via the PWM drivers 53x, 53y to VCMs 3x, 3y. Furthermore, the motion compensation CPU 5y is omitted from FIG. 2.

The lens CPU 7 is a central processing unit which is connected to an EEPROM 71 and outputs focal distance information or lens data read out from the EEPROM 71 to the motion compensation CPUs 5x, 5y. Various lens data, which is intrinsic information related to the interchangeable lens 8, is written in the EEPROM 71. Moreover, the lens CPU 7 inputs focal distance information relating to the focal distance.

The motion compensation lens 10 may be a part of or all of the photographic optical system, and compensates for motion causing image blur by movement of the motion compensation lens 10 in a direction perpendicular, or approximately perpendicular, to the optical axis I. The motion compensation lens 10 is supported with its outer circumference within a lens frame 11.

The VCMs 3x, 3y drive the motion compensation lens 10 in a plane perpendicular to the optical axis I (in the xy plane in the FIG. 1). The VCM 3x generates a drive force in the x-axis direction; the VCM 3y generates a drive force in the y-axis direction. The VCMs 3x, 3y have the same structure, and the VCM 3y is omitted from FIG. 2. The VCM 3x includes a yoke 34x mounted in a mounting member 30x, and a magnet 32x which forms a magnetic field with respect to the yoke 34x. A coil 31x mounted in the lens frame 11 is arranged between the yoke 34x and the magnet 32x. A yoke 33x which fixes the magnet 32x is mounted to the surface of the mounting member 35x toward the lens frame 11. When current is flowing in the coil 31x, the VCMs 3x, 3y generate a force in the direction of the arrow in the FIG. 2, to drive the motion compensation lens 10.

The position detection units 4x, 4y monitor the position of the motion compensation lens 10 within the plane perpendicular to the optical axis I. The position detection units 4x, 4y are disposed in respective positions opposite the VCMs 3x, 3y. The position detection units 4x, 4y have the same structure, and the position detection unit 4y is omitted from FIG. 2. The position detection unit 4x includes an infrared emitting diode (IRED) 41x mounted in a mounting member 40x, a 1-dimensional position sensing diode (PSD) 43x mounted in a mounting member 44x, and a slit member 42x, which limits the light beam from the IRED 41x, mounted in the outer circumference of the lens frame 11 arranged between the IRED 41x and the PSD 43x. The position detection unit 4x detects infrared light projected from the IRED 41x through the slit 42x and incident on the PSD 43x. The position detection unit 4x detects the actual position of the motion compensation lens 10 by detecting the position of the light which moves on the PSD 43x as a result of the movement of the slit member 42x. The position detection unit 4x feeds back to the motion compensation CPU 5x a position detection signal (position detection information) via an A/D converter 54x.

Each of a release switch 60, a film windup mechanism unit 12 to wind up the film, a shutter mechanism 13 to open and close the shutter, a first timer 62, and a second timer 63 are connected to the main CPU 6. The main CPU 6 is a central processing unit which sets ON the first timer 62 and the second timer 63, communicates subject range information to the motion compensation CPUs 5x, 5y, controls driving of the film windup mechanism unit 12 or the shutter mechanism unit 13, and instructs driving of the motion compensation lens 10 to the motion compensation CPUs 5x, 5y, based on, for example, the ON action of the release switch 60. Moreover, the main CPU 6 inputs photographic distance information relating to the distance to the subject. The main CPU 6 communicates with the motion compensation CPUs 5x, 5y via a lens contact point 9.

A half-depression actuation of the release switch 60 commences a series of standard photographic operations. A full-depression actuation of the release switch 60 commences the drive of the film windup mechanism 12, the drive of the shutter mechanism 13, and the like photographic operations.

A method of calculating target drive position information from the angular velocity information of the motion compensation device in accordance with the first embodiment of the present invention will now be described below.

Figure 3:
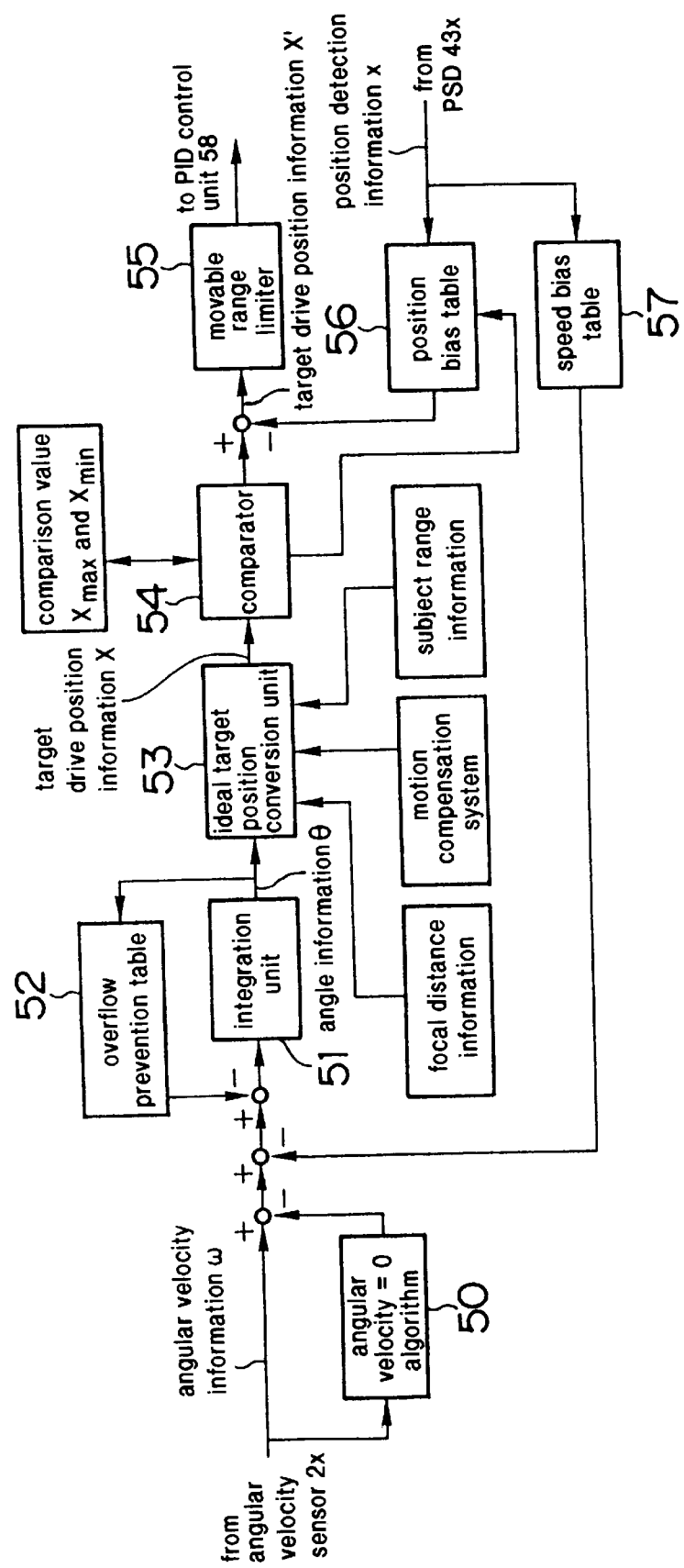
FIG. 3 is a block diagram of a calculation unit of a motion compensation CPU in the motion compensation device in accordance with the first embodiment of the present invention.

FIG. 3 is a block diagram of a calculation unit of the motion compensation CPUs 5x, 5y in the motion compensation device in accordance with the first embodiment of the present invention.

In the following description, an example of driving the motion compensation lens 10 in the x-axis direction from the angular velocity information output by the angular velocity sensor 2x will be described.

An angular velocity=0 algorithm 50 is used to calculate a central value (the value of $\omega$=0 (zero)) from an output signal (angular velocity information) of the angular velocity sensor 2x. When the camera body 1 and interchangeable lens 8 are stationary, and when the output signal $\omega$ of the angular velocity sensor 2x changes, the motion compensation CPU 5x mistakes this situation for motion of the camera body 1 and interchangeable lens 8, and corrects the motion by moving the motion compensation lens 10. Because the motion compensation CPU 5x mistakes the above situation for motion of the camera body causing image blur, it is necessary to calculate, using the angular velocity=0 algorithm 50, the central value of the output signal $\omega$ of the angular velocity sensor 2x. The angular velocity=0 algorithm 50 subtracts the calculated central value from the output signal of the angular velocity sensor 2x, and calculates the angular velocity information necessary for correction. The angular velocity=0 algorithm 50 calculates the central value using a robust filter, such as a moving average method or a digital filter. An integration unit 51 integrates the angular velocity information $\theta$ necessary for motion compensation.

An overflow prevention table 52 prevents overflow of an integral of the integration unit 51 when the angular velocity sensor 2x detects an angular velocity component in the same direction as the motion of the camera body 1 and interchangeable lens 8 for an extended period of time. The length of the extended period of time is determined according to data, such as the focal length of the optical lenses, detected amount of motion, etc.

Figure 4:
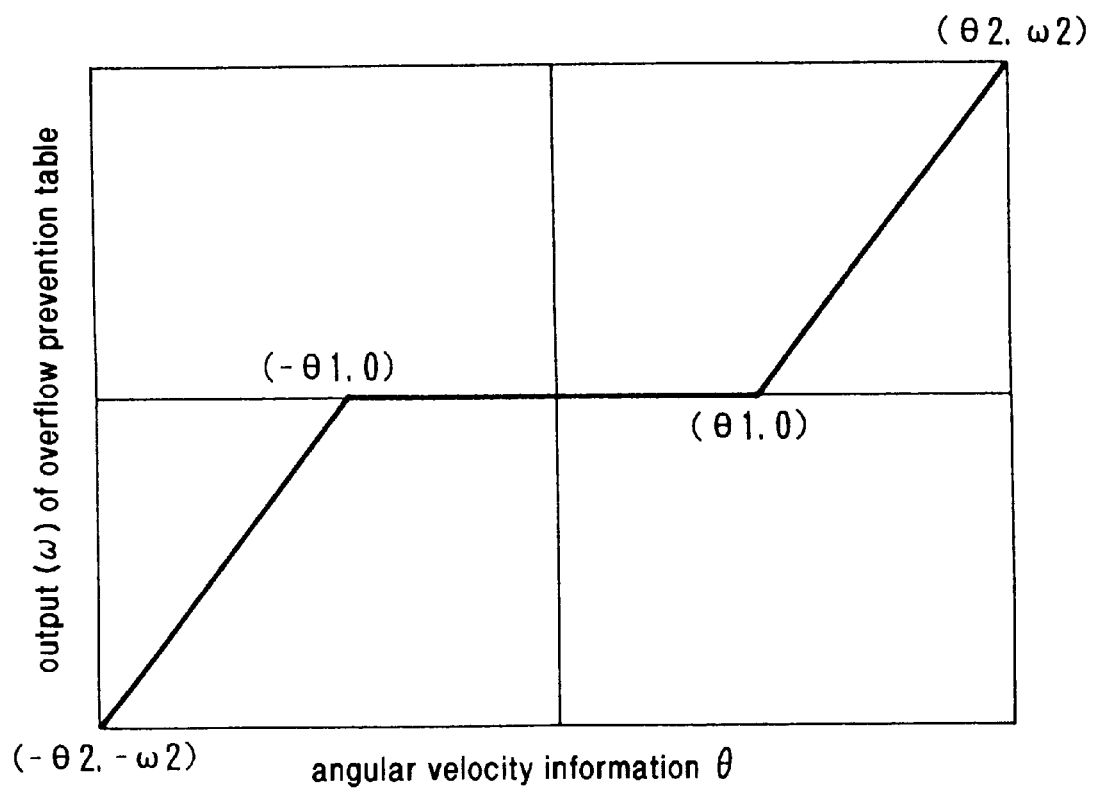
FIG. 4 is a diagram of an overflow prevention table in the motion compensation device in accordance with the first embodiment of the present invention.

FIG. 4 is a diagram of an overflow prevention table of the motion compensation device in accordance with the first embodiment of the present invention.

As shown in FIG. 4, the overflow prevention table 52 generates an output signal according to the magnitude of the angular velocity information $\theta$ after integration. The overflow prevention table 52 is zero, and does not generate an output signal, when the angular velocity information $\theta$ exceeds $-\theta 1$ and falls below $\theta 1$. On the other hand, the overflow prevention table 52 outputs a signal having a negative value when the angular velocity information is more than $-\theta 2$ and is less than $-\theta 1$, and outputs a signal having a positive value when the angular velocity information is more than $\theta 1$ and is less than $\theta 2$. The overflow prevention table 52 prevents overflow when subtracting a generated output signal from angular velocity information. Furthermore, the overflow prevention table 52 is not used during photographic operations. The angular velocity information $\theta$ changes when the overflow prevention table 52 is used under conditions in which the angular velocity information $\theta$ begins to saturate. As a result, the motion compensation CPU 5x erroneously recognizes the change in angular velocity information as motion of the camera body 1 and interchangeable lens 8, which the motion compensation lens 10 corrects.

As shown in FIG. 3, an ideal target position conversion unit 53 converts the angular velocity information $\theta$ after integration into ideal target drive position information (referred to hereinbelow as "target drive position information") of the motion compensation lens 10. The ideal target position conversion unit 53 calculates target drive position information X based on focal distance information f, a motion compensation coefficient α, and subject range information D. The greater the value of the motion compensation coefficient α becomes, the smaller the drive amount of the motion compensation lens 10 for the same motion causing image blur. Moreover, the motion compensation coefficient α is represented by a relationship to the focal distance f. The target drive position information X, when the subject is distant, is represented by the following Equation (1):

$$X = f \times \theta \times \beta / \alpha(f) \qquad \text{Eq.(1)}$$

In Equation (1), θ is the angular velocity of the motion causing image blur, and β is a constant. Moreover, when a subject is close, the motion compensation amount is changed using the subject range information D. The ideal target drive position conversion unit 53 outputs calculated target drive position information X to a comparator 54.

The comparator 54 counts a number of times the target drive position information X increases beyond a maximum comparison value $X_{max}$ and a minimum comparison value $X_{min}$. The comparator 54, comparing the target drive position information X with the previously set comparison values (also referred to as set values) $X_{max}$, $X_{min}$, outputs the target drive position information X unchanged. The output signal of a position bias table 56 is subtracted from the target drive position information X to produce target drive position information X' which is input to a movable range limiter 55.

The movable range limiter 55 regulates by software the drive range (range of movement) of the motion compensation lens 10. The movable range limiter 55 is disposed on the inside of a mechanical limit which mechanically regulates the drive range of the motion compensation lens 10, and the limit value is set by the software to ± L. The movable range limiter 55 outputs the target drive position information X' to a proportional integral differential (PID) control unit 58 (FIG. 5).

Figure 5:
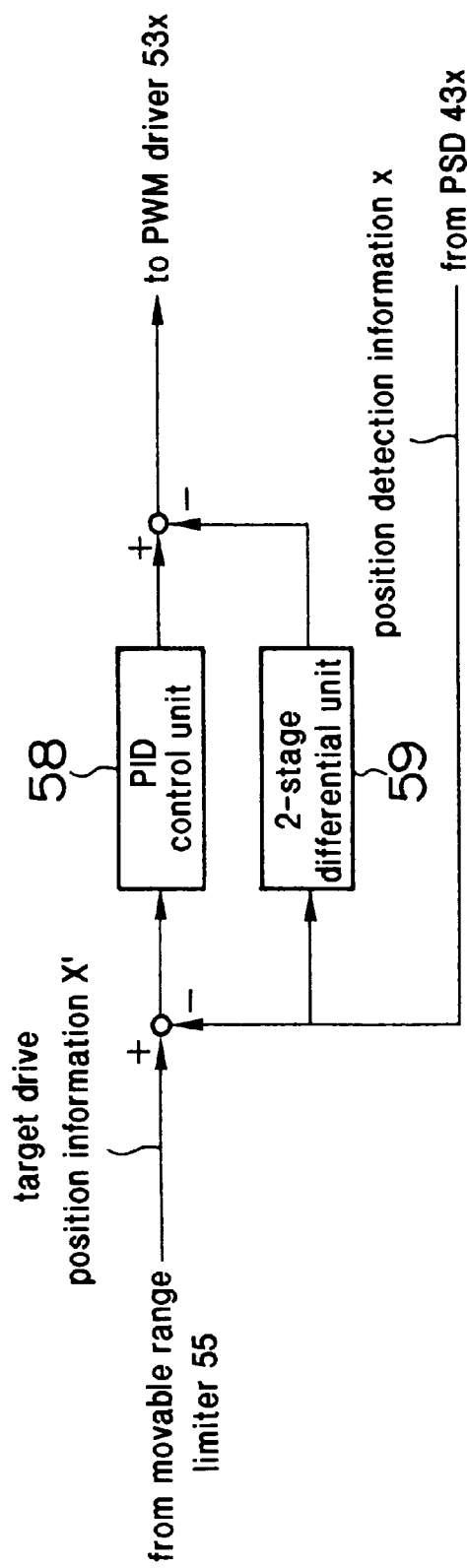
FIG. 5 is a block diagram of a control unit of the motion compensation CPU in the motion compensation device in accordance with first embodiment of the present invention.

FIG. 5 is a block diagram of a control unit of the motion compensation CPU 5x of the motion compensation device in accordance with the first embodiment of the present invention.

The PID control unit 58 controls the VCM 3x such that the VCM 3x drives the motion compensation lens 10 based on the target drive position information X'. The PID control unit 58 controls the VCM 3x based on a difference between the position detection information x, which the PSD 43x outputs, and the target drive position information X'. The PID control unit 58 outputs to the PWM driver 53x a signal representing a difference between the output signal of a 2-stage differential unit 59 and the output of the PID control unit 58. The PSD 43x monitors the position of the motion compensation lens 10 which is driven by the PID control unit 58, as shown in FIG. 3, and outputs position detection information x to the position bias table 56 and to the speed bias table 57.

The 2-stage differential unit 59 calculates the acceleration of the motion compensation lens 10, differentiating in two (2) stages the position detection information x output by the PSD 43x. As shown in FIG. 5, the output signal (2-stage differential value) of the 2-stage differential unit 59 is subtracted from the output signal of the PID control unit 58 is performed such that excessive movement of the motion compensation lens 10 does not occur.

When a large target drive position information X is input to the position bias table 56, the position bias table 56 corrects the target drive position information X to correct the drive position of the motion compensation lens 10 such that sudden speed changes do not arise in the motion compensation lens 10.

Figure 6:
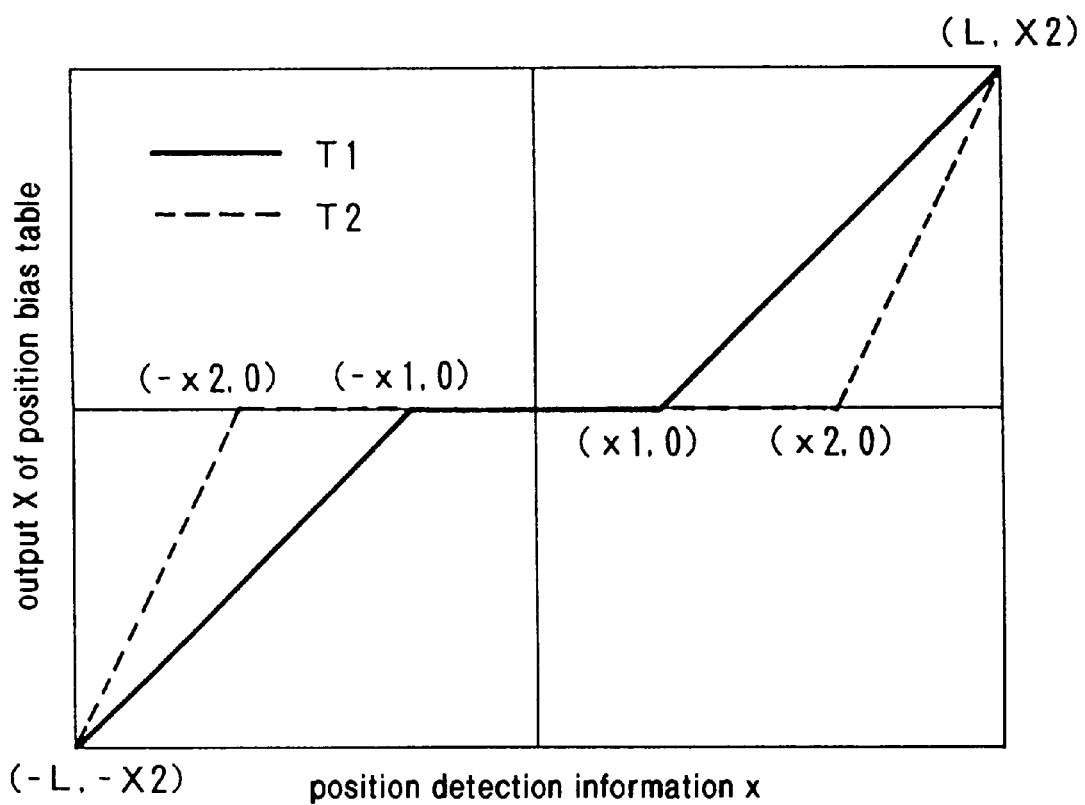
FIG. 6 is a diagram of a position bias table in the motion compensation device in accordance with the first embodiment of the present invention.
Figure 7:
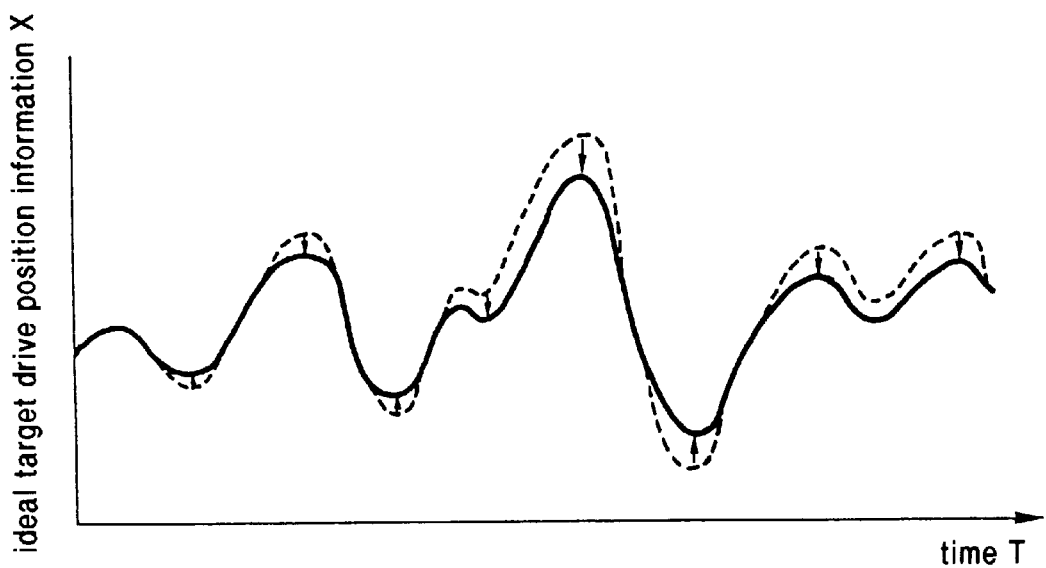
FIG. 7 is a graph of target drive position information corrected by the position bias table in the motion compensation device in accordance with the first embodiment of the present invention.

FIG. 6 is a diagram showing the position bias table 56 in the motion compensation device in accordance with the first embodiment of the present invention. FIG. 7 is graph of the target drive position information X corrected by the position bias table 56 in a motion compensation device in accordance with the first embodiment of the present invention. As shown in FIG. 6, the position bias table 56 includes two types of tables, a table T1 having large correction amounts and a table T2 having small correction amounts. The position bias table 56 changes between the table T1 and the table T2 based on the comparison result of the comparator 54. When the position detection information x of the motion compensation lens 10 exceeds −x1 and falls below x1, the position bias table 56 is changed to table T1, and does not generate an output signal. When the position detection information x is greater than or equal to −L and less than or equal to −x1, or greater than or equal to x1 and less than or equal to L, an output signal is generated as shown in FIG. 6. As shown in FIG. 3, the output signal of the position bias table 56 is subtracted from the target drive position information X output by the comparator 54. As a result, as shown in FIG. 7, when a large target drive position information X (dotted line in FIG. 7) is input, the target drive position information X is distorted as shown by full lines in FIG. 7, such that no sudden speed changes occur in the motion compensation lens 10.

However, when the position detection information x is excessive (below −x1 or above x1), the target drive position information X is corrected by the large correction amount table T1, and the motion compensation effect in the viewfinder is reduced. Consequently, when the position detection information x is determined to be large, the position bias table 56 changes from the large correction amount table T1 to the small correction amount table T2. As a result, the deformation amount of the target drive position information X becomes small, and sufficient motion compensation effects can be obtained for large motions causing image blur.

When the motion compensation lens 10 is driven centrally in a position biased from the center of the possible range of movement, the speed bias table 57 causes the motion compensation lens 10 to be returned to the center, or a neighborhood of the center, of a range of movement of the motion compensation lens 10 by correcting the drive speed of the compensation lens 10.

Figure 8:
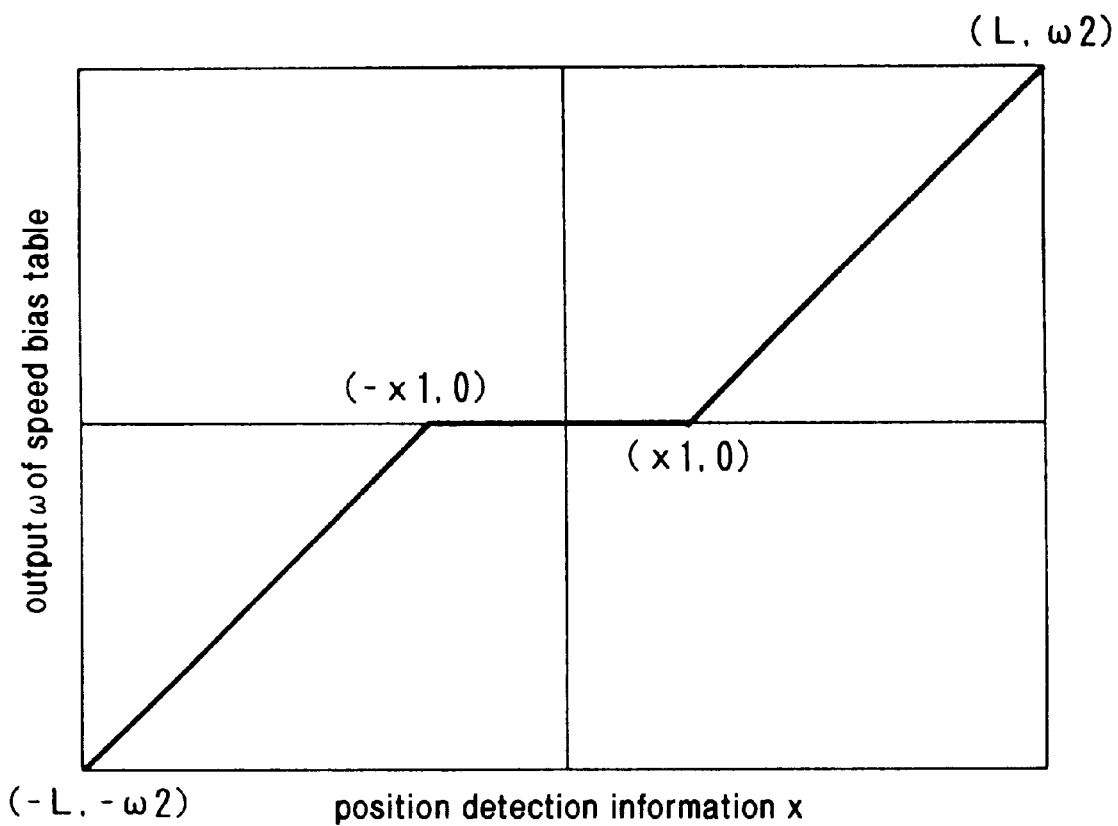
FIG. 8 is a diagram of a speed bias table in the motion compensation device in accordance with the first embodiment of the present invention.
Figure 9:
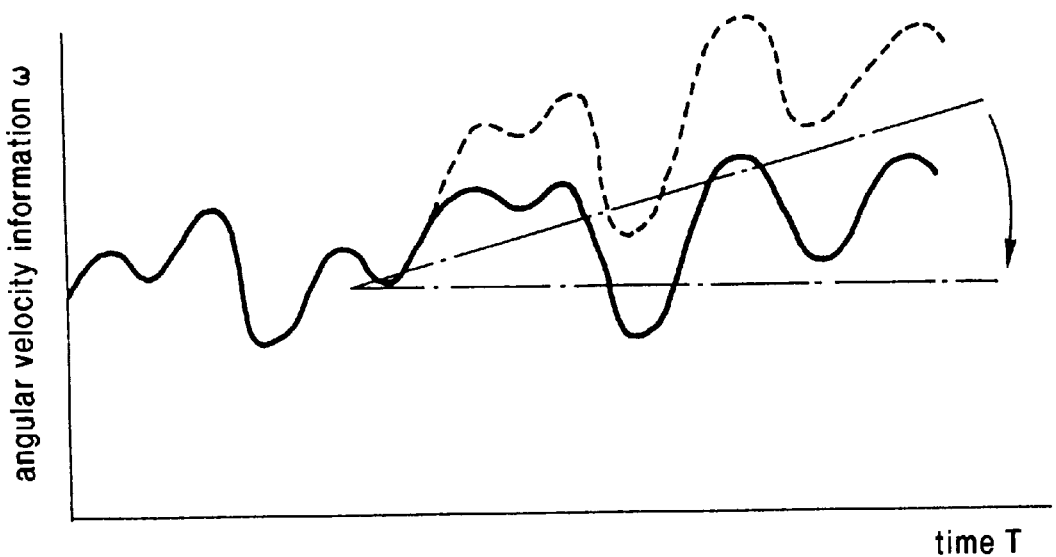
FIG. 9 is a graph of the target drive position information which has been corrected by the speed bias table in the motion compensation device in accordance with the first embodiment of the present invention.

FIG. 8 is a diagram showing the speed bias table 57 in the motion compensation device in accordance with the first embodiment of the present invention. FIG. 9 is a graph of the target drive position information corrected by the speed bias table 57 in a motion compensation device in accordance with the first embodiment of the present invention.

As shown in FIG. 8, when the position detection information x of the motion compensation lens 10 exceeds −x1 and is less than x1, the speed bias table 57 generates no output signal. However, when the position detection information x of the motion compensation lens 10 is greater than −L but less than −x1, or is less than L but greater than x1, an output signal as shown in FIG. 8 is generated. As shown in FIG. 3, the output signal of the speed bias table 57 is subtracted from the angular velocity information ω which it is necessary to correct. As a result, as shown in FIG. 9, when the motion compensation lens 10 is driven in a position biased from the center of the possible range of movement, the motion compensation lens 10 can be returned to the center of the range of movement, or to a neighborhood of the center of the range of movement, by correcting the angular velocity ω (shown by the dotted line in FIG. 9) to correspond to the full line in FIG. 9.

Figure 10:
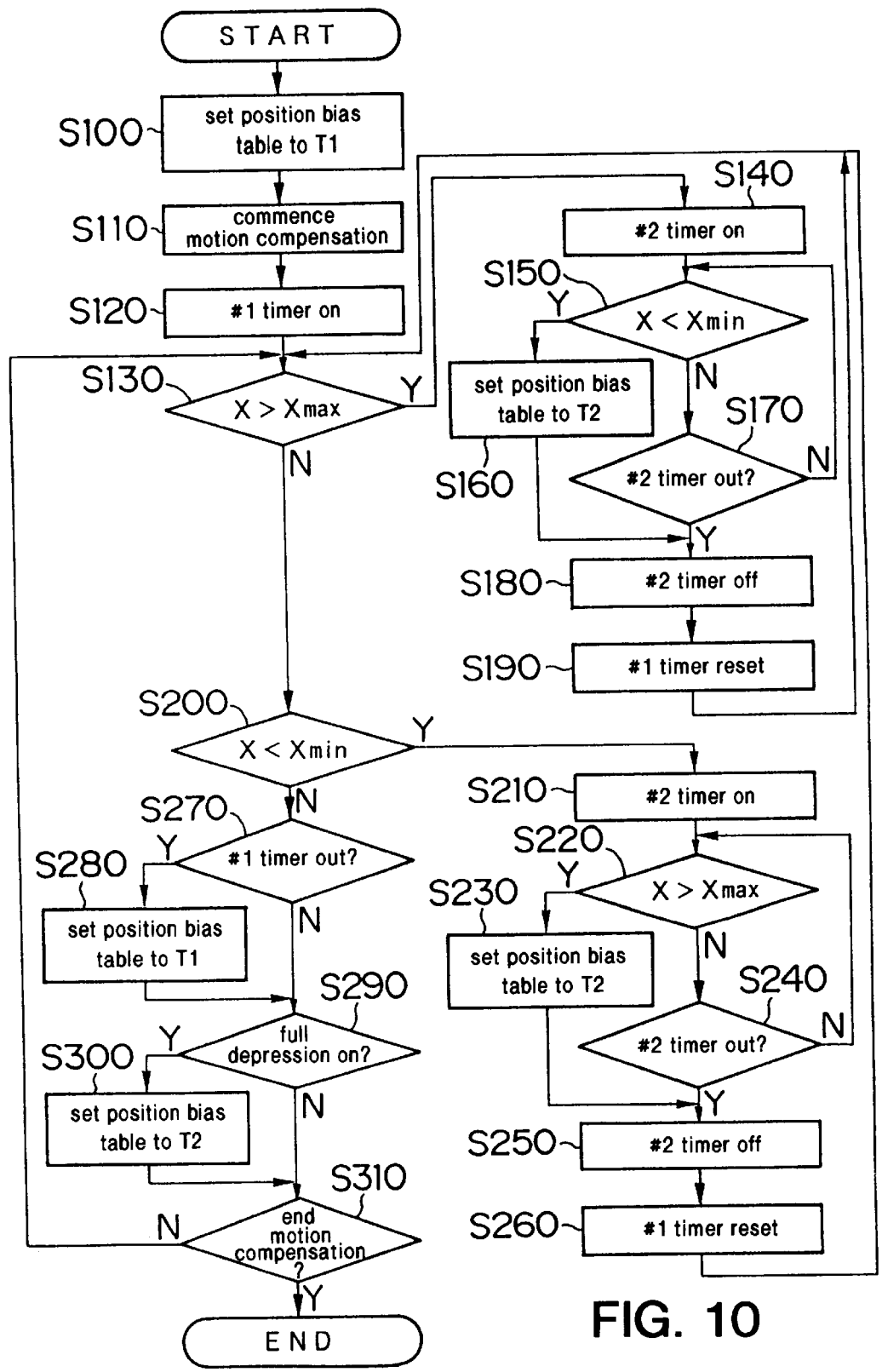
FIG. 10 is a flow chart illustrating an operational process for operating the motion compensation device in accordance with the first embodiment of the present invention.
Figure 11:
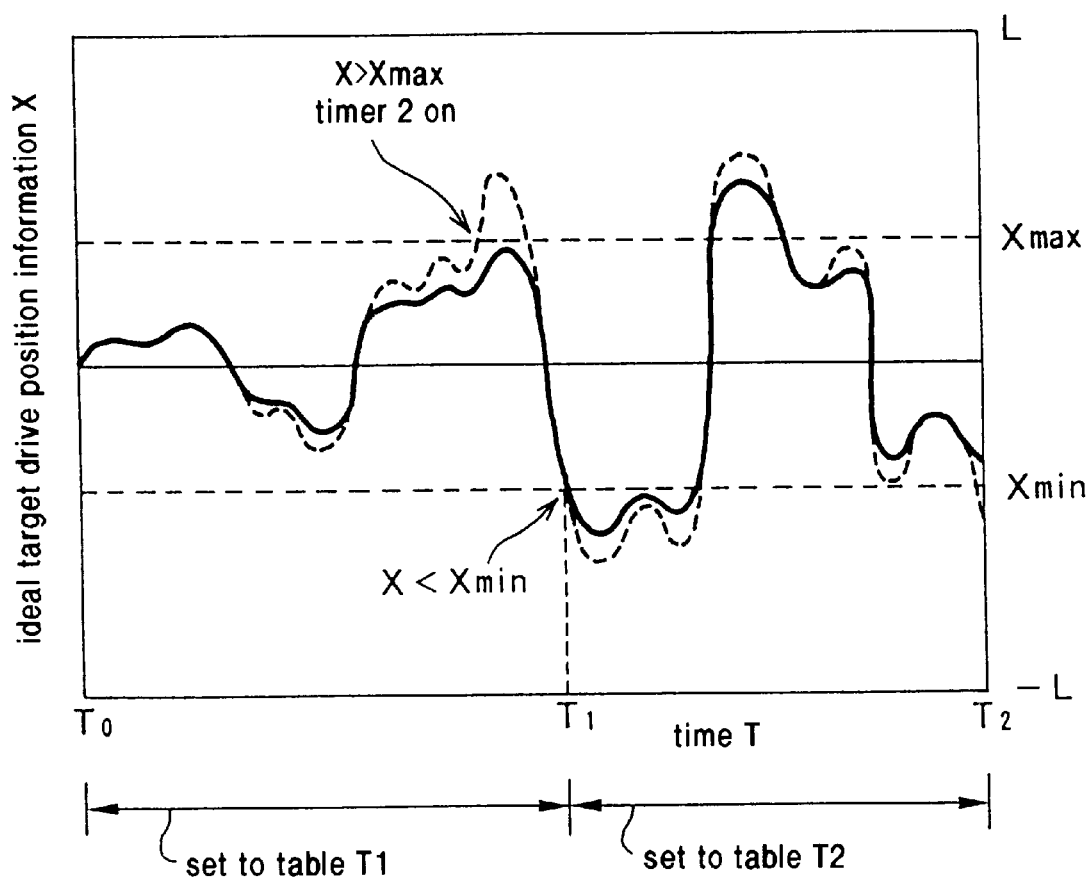
FIG. 11 is a diagram illustrating the operation of the motion compensation device in accordance with the first embodiment of the present invention.

An operation of the motion compensation device in accordance with the first embodiment of the present invention will now be described below with reference to FIG. 10, which is a flow chart of an operational process for performing motion compensation control with the motion compensation device in accordance with the first embodiment of the present invention. FIG. 11 is a diagram illustrating the operation of the motion compensation device in accordance with the first embodiment of the present invention.

Beginning in step (referred to hereinbelow as "S") 100, in response to half-depression of the release switch 60, various camera devices are initiated and the position bias table 56 is set to the table T1 shown in FIG. 6. More particularly, when the release switch 60 is half depressed, the main CPU 6 outputs motion compensation commencement signals to the motion compensation CPUs 5x, 5y, and a power supply unit (not shown in the drawing) supplies electric power to the angular velocity sensors 2x, 2y, and other components. Moreover, simultaneously with the half depression of the release switch 60, the main CPU 6 actuates a half-depression timer to ON. Then, directly after the introduction of the power supply, the motion compensation CPUs 5x, 5y set the position bias table 56 to the large correction amount table T1.

Next, in S110, motion compensation is commenced. The motion compensation CPUs 5x, 5y commence a sequence of operations based on the motion compensation commencement signal of the lens CPU 6. The motion compensation CPUs 5x, 5y calculate the target drive position information X with the ideal target drive position conversion unit 53, based on the angular velocity information output by the angular velocity sensors 2x, 2y. As shown in FIG. 11, the table T1 effects a large correction of the target drive position information X (dotted line in FIG. 11) within the time in which the table T1 is set (time T0 through T1), to distort target drive position to the waveform shown by the full line in FIG. 11. As a result, during panning or composition changes the image moves in the viewfinder, because the range of movement of the motion compensation lens 10 is centered on the optical axis I, or is centered in a neighborhood of the optical axis I, and the photographer does not experience a sensation of physical disorder.

Moreover, during the time that the table T1 is selected, the target drive position information X is larger than the comparison value $X_{min}$, which is the minimum set value, and smaller than the comparison value $X_{max}$, which is the maximum set value, and the motion compensation is small. As a result, because the motion causing image blur is small and the motion compensation lens 10 is driven at the optical axis I or a neighborhood of the optical axis I, which is the center of the range of movement of the motion compensation lens 10, because the motion causing image blur is small, the motion compensation effect can be sufficiently obtained.

In S120, the first timer 62 is actuated ON by the main CPU 6 simultaneously with a half-depression operation of the release switch 60.

Continuing in S130, the comparator 54 determines whether or not the target drive position information X is greater than the comparison value $X_{max}$. If the target drive position information X is greater than the comparison value $X_{max}$, then the operational process proceeds to S140; if the target drive position information X is smaller than the comparison value $X_{max}$, then the operational process proceeds to S200.

In S140, the second timer 63 is actuated ON by the main CPU 6. As shown in FIG. 11, as the amplitude of the motion causing image blur becomes greater, the target drive position information X exceeds the comparison value $X_{max}$, and simultaneously or about simultaneously with the target drive position information X exceeding the comparison value $X_{max}$, the second timer 63 is actuated ON by the main CPU 6.

Next, in S150, the comparator 54 determines whether or not the target drive position information X is smaller than the comparison value $X_{min}$. As shown in FIG. 11, when the target drive position information X falls below the comparison value $X_{min}$ during the ON actuation (i.e., before time-out) of the second timer 63, the comparator 54 determines that the motion amplitude has become large because a large motion has been input, and the operational process proceeds to S160. On the other hand, when the target drive position information X is larger than the comparison value $X_{min}$, the operational process proceeds to S170.

In S160, the position bias table 56 is set to the table T2. As shown in FIG. 11, when the amplitude of the target drive position information X becomes large, the target drive position information X is represented by a greatly distorted waveform, as shown by the full line in FIG. 11. As a result, when the position bias table 56 is set to the large correction amount table T1, the target drive position information X is greatly distorted, and the effect of motion compensation cannot be obtained. When the comparator 54 determines during the actuation of the second timer 63 that the input motion causing image blur is large the position bias table 56 changes, at a time $T_1$, from the large correction amount table T1 to the small correction amount table T2. Because of changing from the table T1 to the table T2, as shown in FIG. 11, the amount of distortion of the target drive position information X (dotted line in the FIG. 11) becomes small from time $T_1$ to time $T_2$, compared with the time from time $T_0$ to time $T_1$, as shown by the full line in the FIG. 11. Moreover, as shown in FIG. 6, when the width of the flat portion of the position bias table 56 becomes wide, the amount of correction becomes small, and it is possible to deal with an even larger amount of blurring motion, and a sufficient motion compensation effect can be obtained.

In S170, the motion compensation CPUs 5x, 5y determine whether or not the second timer 63 has timed out. When the second timer 63 has timed out, the operational process proceeds to S180. While the second timer 63 is actuated ON, when the target drive position information X is not below the comparison value $X_{min}$, the comparator 54 determines that the motion causing image blur is biased in one direction as a result, for example, of a composition change by the photographer, panning or drift of the angular velocity sensors 2x, 2y. When there is a composition change or panning by the photographer, when setting the position bias table 56 to the wide flat portion (small correction amount) table T2, a delay occurs in the movement of the image with respect to the operation by the photographer, and the photographer has a sense of physical disorder. Because of this, the comparator 54 does not change the position bias table 56 to the table T2. When the second timer 63 has not timed out, the operational process returns to S150, and the comparator 54 repeats the determination of whether or not the target drive position information X has fallen below the comparison value $X_{min}$.

In S180, actuation of the second timer 63 ends and the second timer 63 is OFF. Next, in S190, the first timer 62 is reset, and the operational process returns to S130. In S130, the comparator 54 repeats the determination of whether or not the target drive position information X exceeds the comparison value $X_{max}$.

If the target drive position information X does not exceed the comparison value $X_{max}$ (S130), the operational process proceeds to S200 and the comparator 54 determines whether or not the target drive position information X is smaller than the comparison value $X_{min}$. If the target drive position information X does not exceed the comparison value $X_{max}$ (S130), and is below the comparison value $X_{min}$ (S200), the operational process proceeds to S210. When the target drive position information X does not exceed the comparison value $X_{max}$, and is below the comparison value $X_{min}$, the operational process proceeds to S270.

In S210, the second timer 63 is actuated ON and the comparator 54 determines whether or not the target drive position information X is larger than the comparison value $X_{max}$ (S220). When the target drive position information X is larger than the comparison value $X_{max}$, the operational process proceeds to S230. In S230, the position bias table 56 is set to the table T2, and large blurring motion can be dealt with. On the other hand, when the target drive position information X is smaller than the comparison value $X_{max}$, the operational process proceeds to S240. In this case, the position bias table 56 does not change to the table T2 because the target drive position information X represents a composition change by the photographer, panning or drift of the angular velocity sensors 2x, 2y. Then, in S240, it is determined whether or not the second timer 63 has timed out. When the second timer 63 has not timed out, the operational process returns to S220.

Continuing in S250, the second timer 63 is actuated OFF, and in S260 the first timer 62 is reset. After S260, the operational process proceeds to S130, and the comparator 54 repeats the determination of whether or not the target drive position information X is larger than the comparison value $X_{max}$.

When the target drive position information X does not fall below $X_{min}$ (S200), in S270 the motion compensation CPUs 5x, 5y determine whether or not the first timer 62 has timed out. When the first timer 62 has timed out, the operational process proceeds to S280, and when the first timer 62 has not timed out, the operational process proceeds to S290.

In S280, the position bias table 56 is set to the table T1. When the position bias table 56 is set to table T2, when no large motion causing image blur is input during the ON actuation of the first timer 62, the position bias table 56 is changed from the table T2, which has a wide flat portion, to the table T1 which has a narrow flat portion. As a result, even if the photographer performed panning or a composition change, etc., the image is scarcely delayed in its timing.

In S290, it is determined whether or not a full-depression switch of the release switch 60 has been actuated ON. When the full-depression switch of the release switch 60 has been actuated, the operational process proceeds to S300. When the full-depression switch of the release switch 60 is not actuated, the operational process proceeds to S310.

In S300, the position bias table 56 is set to the table T2. In the operational process shown in FIG. 10, when a full-depression actuation of the release switch 60 occurs, the motion compensation CPUs 5x, 5y set the position bias table 56 to the table T2, which has a wide flat portion. The target drive position information X is predominant as a photographic result, distortion being scarcely present than setting to the small correction amount table T2. Because of this, at the time of a photographic operation, the motion compensation CPU 5x is arranged to perform motion compensation according to the wide flat portion of position bias table 56.

In S310, it is determined whether or not the motion compensation has ended. The CPUs 5x, 5y determine whether or not motion compensation has ended based on the OFF actuation of the motion compensation start switch 14 or the time-out of the half depression timer. When motion compensation ends, the operational process set forth in the flow chart of FIG. 10 ends. When the motion compensation start switch 14 is actuated OFF or the half-depression timer has not timed out the operational process returns to S130, and the determination of whether or not the target drive position information X is greater than the comparison value $X_{max}$ is repeated.

In the motion compensation device in accordance with the first embodiment of the present invention, the position bias table 56 is set to the large correction amount table T1 directly after introduction of a power supply. Because of this, the target drive position information X is corrected, and the motion compensation lens 10 is driven to a position of the optical axis I, which is the center of the range of movement of the motion compensation lens 10, or in a neighborhood of the center of the range of movement of the motion compensation lens 10. As a result, when the photographer changes the composition or performs panning, the problem of the image in the viewfinder following slowly because of large driving of the motion compensation lens 10 by motion compensation action, while the image within the viewfinder does not move, is solved.

Moreover, the comparator 54 changes from the large correction amount table T1 to the small correction amount table T2 when the second timer 63 is actuated ON, and the target drive position information X exceeds the comparison value $X_{max}$, which is the maximum set value, and falls below the comparison value $X_{min}$, which is the minimum set value. Because of this, when the input motion is a large motion causing image blur, the correction amount is small. Further, because the table T2 has a wide flat portion, motion causing image blur can be effectively compensated fully with small distortion of the target drive position information X.

Furthermore, after the comparator 54 changes over to the table T2 during the ON actuation of the first timer 62, when the target drive position information X does not exceed the comparison value $X_{max}$, and is not below the comparison value $X_{min}$, the comparator 54 resets to the table T1. Because of this, when a large motion causing image blur is not input, the comparator 54 quickly changes from the table T2 to the table T1, and panning or composition changes by the photographer can be dealt with.

In accordance with the first embodiment of the present invention, when the limit of the range of movement of the motion compensation lens 10 is close to ± L, the position bias table 56 controls the motion compensation lens 10 to return by a predetermined amount toward the center of the range of movement of the motion compensation lens 10. Because of this, the motion compensation lens 10 is controlled to gradually approach the movable range limit ± L, and can gradually become distant. As a result, disadvantages, such as the collision of the motion compensation lens 10 with a mechanical limit, and sudden changes of the speed of the image in the viewfinder, can be obviated, and a bad impression of the view of the image in the viewfinder can be prevented.

Second Preferred Embodiment

Figure 12:
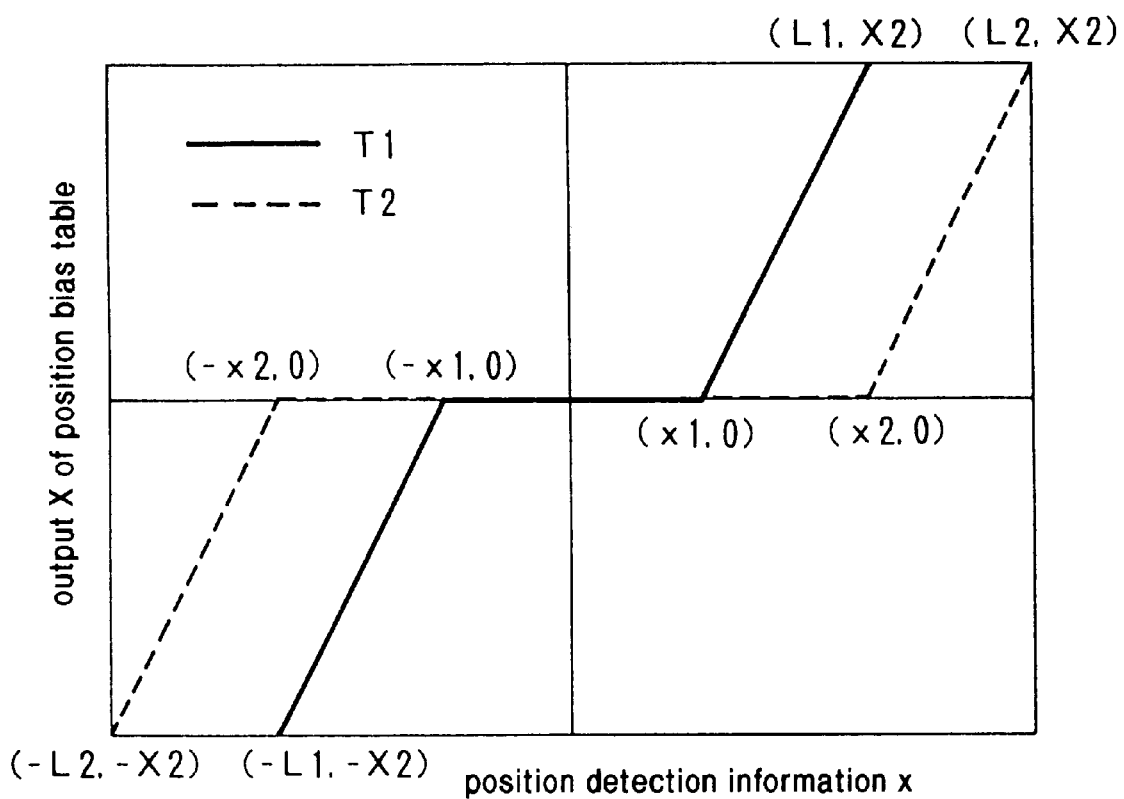
FIG. 12 is a diagram of a position bias table of a motion compensation device in accordance with a second embodiment of the present invention.

FIG. 12 is a diagram of a position bias table in a motion compensation device in accordance with a second preferred embodiment of the present invention. All other features and elements of the second preferred embodiment are the same as those described hereinabove with respect to the first embodiment of the invention.

The motion compensation device in accordance with the second embodiment of the present invention has a position bias table configured as shown in FIG. 12, having a range of movement (−L2 to L2) of the motion compensation lens 10 when the table T2 is set, and a narrower range of movement (−L1 to L1) of the motion compensation lens 10 when the table T1 is set.

Because of this, directly after the introduction of a power supply, the position bias table is set to the table T1, and a lag of the image in the viewfinder during panning or a composition change can be effectively prevented, in comparison with the position bias table 56 shown in FIG. 6.

Third Preferred Embodiment

Figure 13:
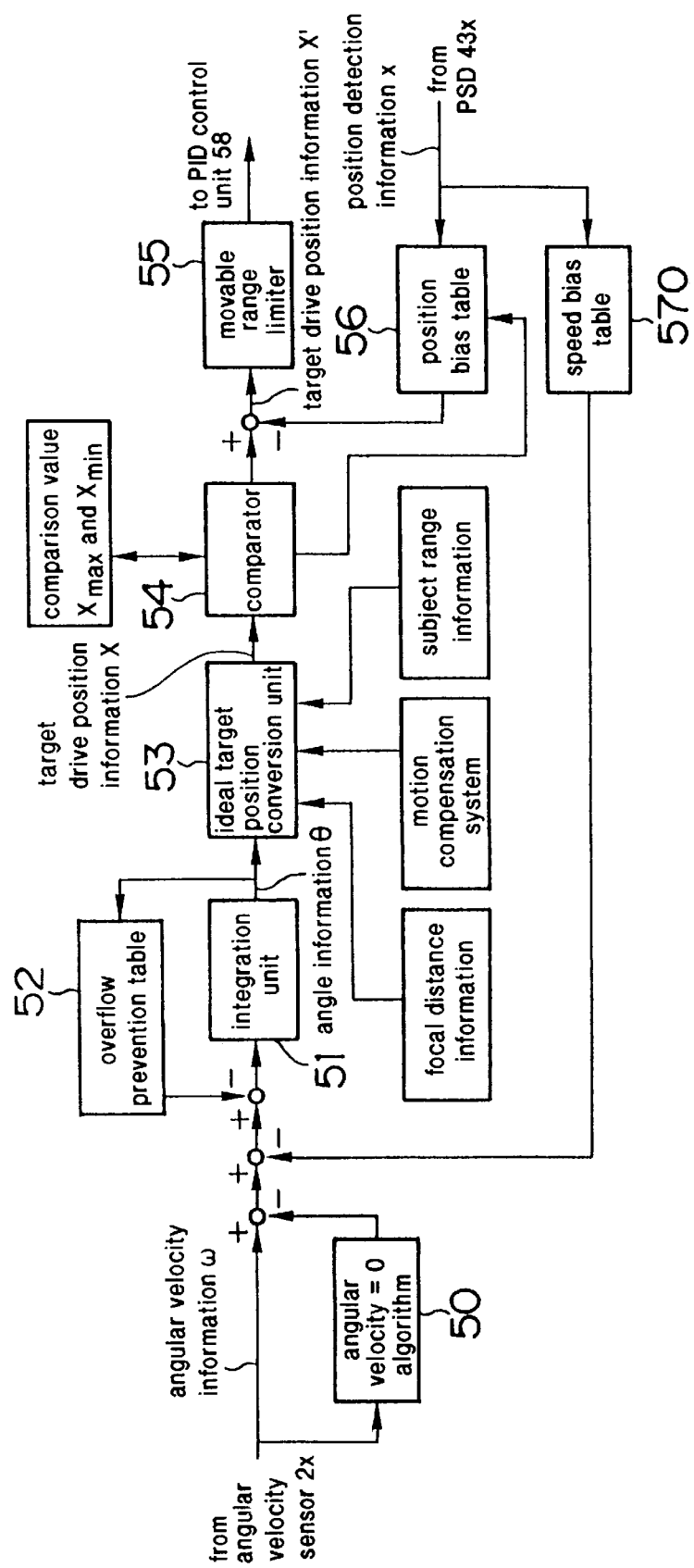
FIG. 13 is a block diagram of a calculation unit of a motion compensation CPU in a motion compensation device in accordance with a third embodiment of the present invention.
Figure 14:
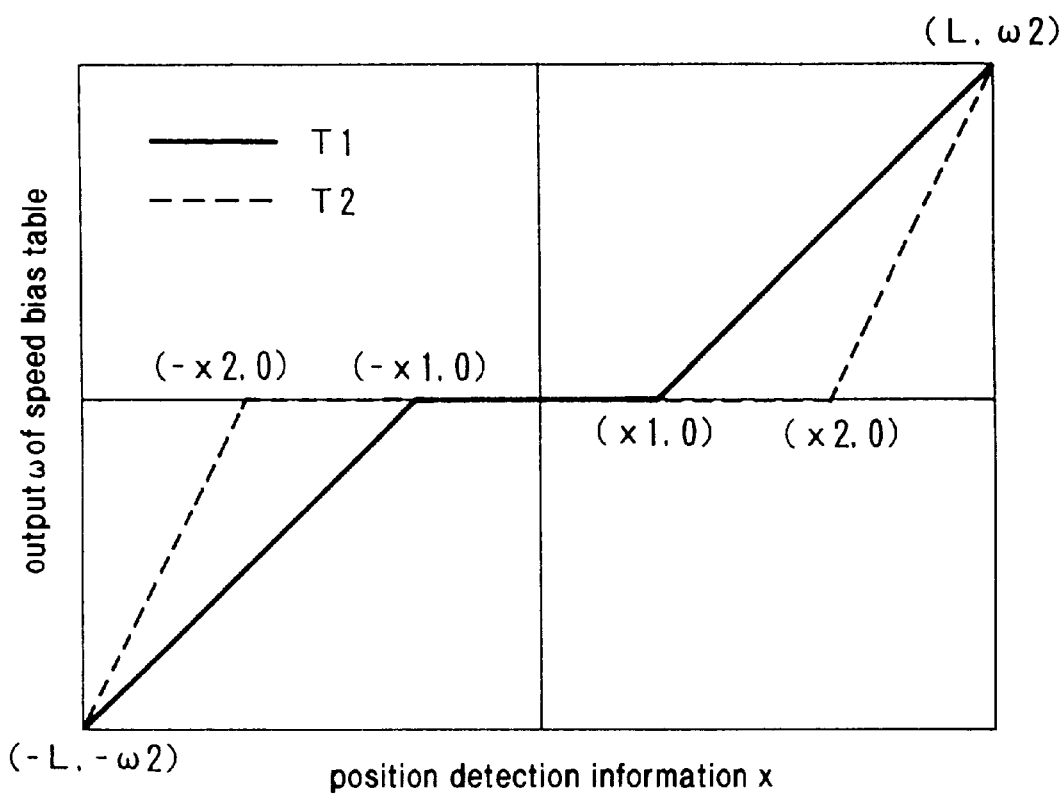
FIG. 14 is a diagram of a speed bias table of the motion compensation device in accordance with the third embodiment of the present invention.

FIG. 13 is a block diagram of a calculation unit of a motion compensation CPU in a motion compensation device in accordance with a third embodiment of the present invention. FIG. 14 is a diagram of a speed bias table 570 in the motion compensation device in accordance with the third embodiment of the present invention.

Similar to the position bias table 56 shown in FIG. 6, the speed bias table 570 in accordance with the third embodiment of the present invention has a large correction value table T1 and a small correction value table T2. A changeover between table T1 and table T2 is made based on the comparison result of the comparator 54. The method of selection of the table T1 and the table T2 is similar to that described above with respect to the first embodiment of the present invention, and a detailed description will not be repeated here.

The motion compensation device in accordance with the third embodiment of the present invention feeds back the comparison result of the comparator 54 to the position bias table 56 and speed bias table 570. For example, when the photographer takes a photograph while the camera body 1 and interchangeable lens 8 are moving, an offset component is added to the waveform representing motion causing image blur. Because of this, using only the position bias table 56, the effect of motion compensation becomes reduced close to the movable range limit ± L. The speed bias table 570 can increase the effect of motion compensation because the speed bias table 570 corrects to restore the motion compensation lens 10 within the movable range limits ± L.

Moreover, the position bias table 56 and speed bias table 570 can correct the target drive position information X to drive the motion compensation lens 10 to the center of its range of movement, or to a neighborhood of the center of the range of movement. Because of this, when the camera body 1 and interchangeable lens 8 are moved, the image in the viewfinder can be close to what the photographer intended.

Furthermore, the position bias table 56 and the speed bias table 570 can respectively be set to tables T2 which have wide flat portions. Because of this, when there is a large blurring motion input, more natural motion compensation effects can be obtained.

Fourth Preferred Embodiment

A motion compensation device in accordance with a fourth preferred embodiment of the present invention will now be described hereinbelow with reference to FIGS. 15–23. drawings. The description of the motion compensation device in accordance with the fourth embodiment of the present invention is described hereinafter as part of a single lens reflex camera. However, the fourth embodiment of the present invention is not limited to use in a single lens reflex camera, and can be used in other types of cameras.

Figure 15:
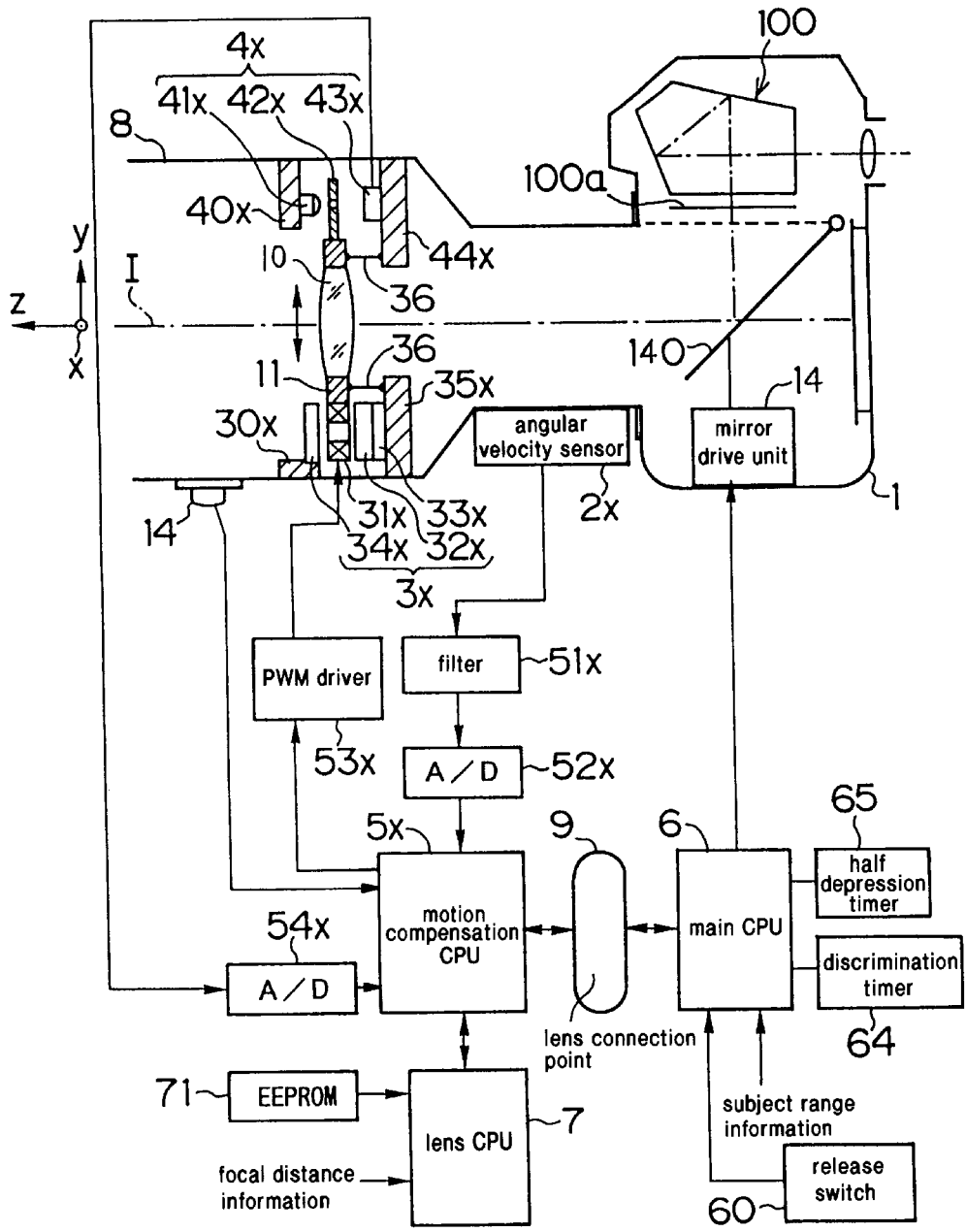
FIG. 15 is a block diagram of a motion compensation device in accordance with a fourth embodiment of the present invention.

FIG. 15 is a block diagram of a motion compensation device in accordance with the fourth embodiment of the present invention. Elements shown in FIG. 15 which are the same as or similar to the motion compensation device shown in FIGS. 1 and 2 and described with respect to the first embodiment of the invention are referred to by the same reference numerals and symbols, and a detailed description of the like elements will not be repeated here.

As shown in FIG. 15, the release switch 60, a mirror drive unit 14, a discrimination timer 64 and a half-depression timer 65 are connected to the main CPU 6. The main CPU 6, for example, is a central processing unit which controls drive of a mirror drive unit 14 and actuates ON a discrimination timer 64 and a half-depression timer 65, based on the ON actuation of the release switch 60. The discrimination timer 64 discriminates the time until the output of the angular velocity sensors 2x, 2y stabilizes.

The half-depression timer 65 is actuated ON simultaneously with the half-depression actuation of the release switch 60. The motion compensation lens 10 is supported by a wire 36 to move freely in the xy plane. The mirror drive unit 14 is driven at a photographic operation time, and moves a quick return mirror 140 away from the photographic light path. The quick return mirror 140 directs to a viewfinder 100a and a pentagonal prism 100 the light beams coming through a photographic optical system.

A method of calculating the target drive position information from the angular velocity information of the motion compensation device in accordance with the fourth embodiment of the present invention will now be provided below.

Figure 16:
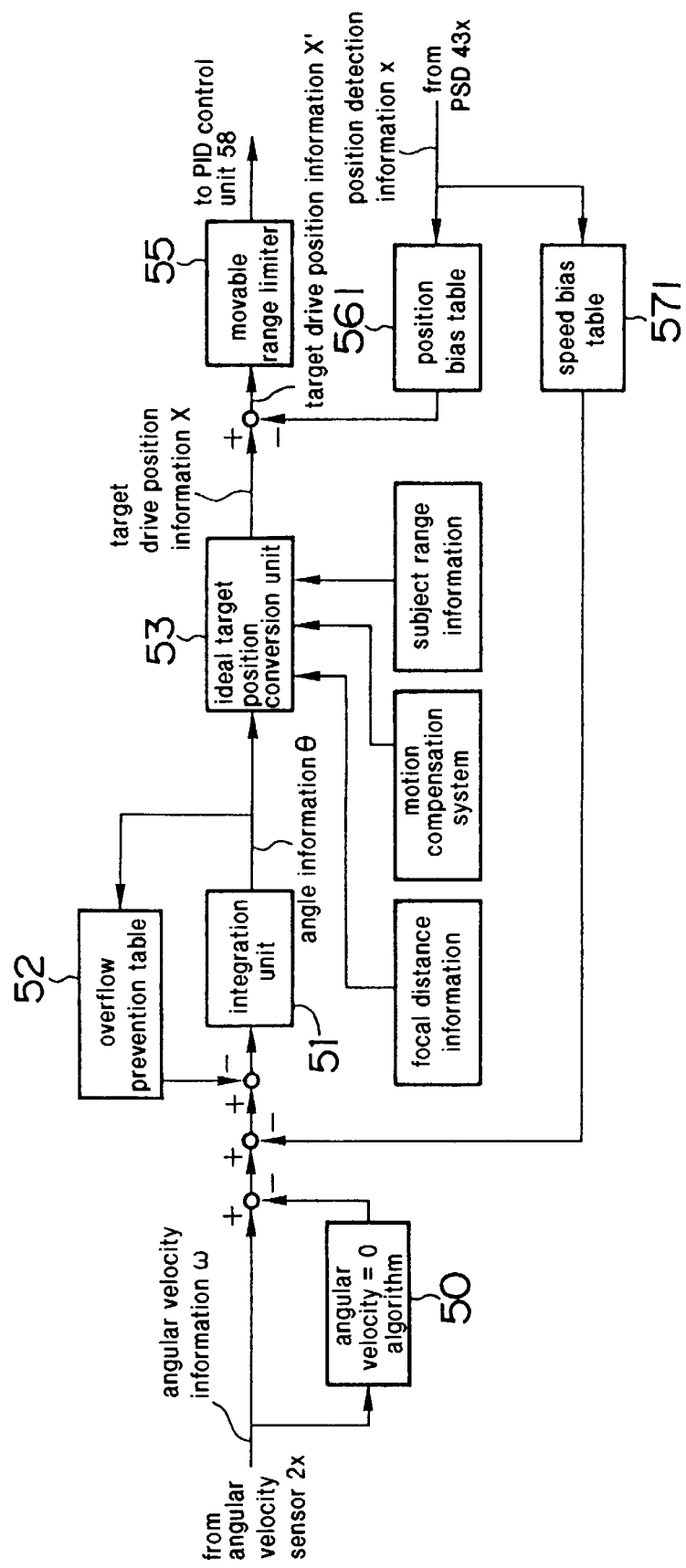
FIG. 16 is a block diagram of a calculation unit of a motion compensation CPU in the motion compensation device in accordance with the fourth embodiment of the present invention.

FIG. 16 is a block diagram of a calculation unit of the motion compensation CPU in the motion compensation device in accordance with the fourth embodiment of the present invention. Elements shown in FIG. 16 which are the same as or similar to elements shown in FIG. 3 are referred to by like reference symbols and numerals, and a detailed description of these like elements will not be repeated here.

Furthermore, by way of example, the description of the fourth embodiment of the present invention hereinafter is provided with respect to the case in which the motion compensation lens 10 is driven in the x-axis direction from angular velocity information output by the angular velocity sensor 2x.

As shown in FIG. 16, a position bias table 561 causes distortion of the target drive position information X thereby correcting the target drive position information X when large target drive position information X is input, and corrects the drive position of the motion compensation lens 10 such that sudden speed changes in the motion compensation lens 10 do not occur.

Figure 17:
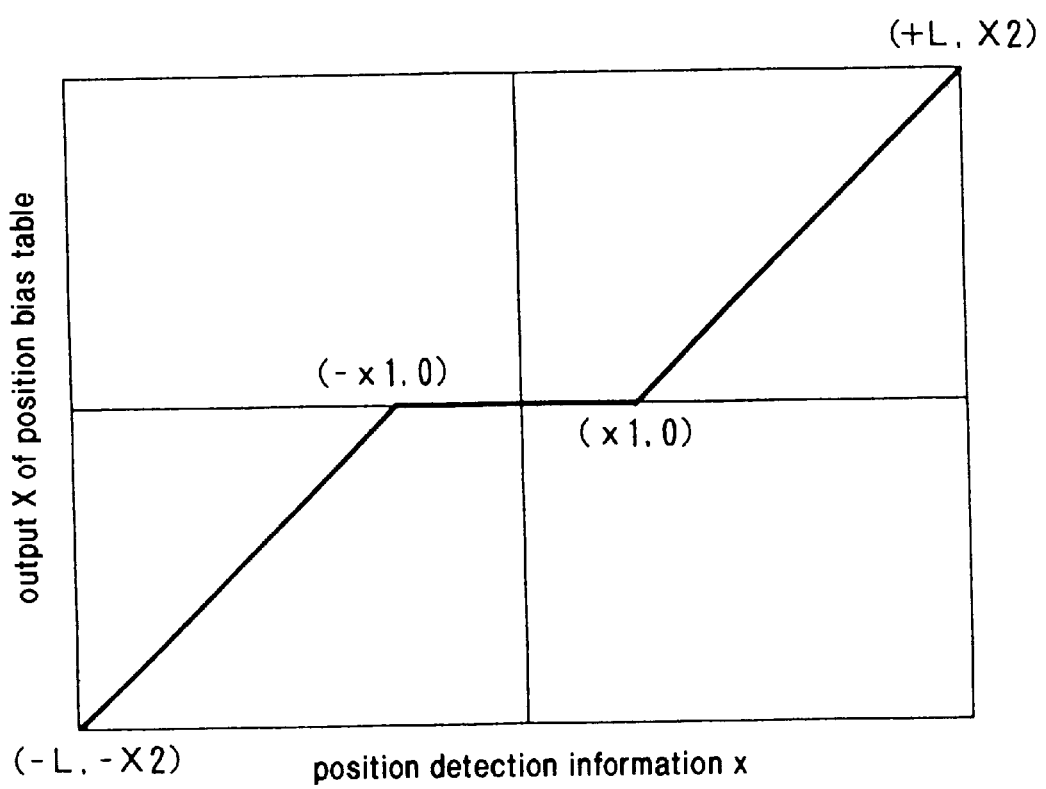
FIG. 17 is a diagram of a position bias table of the motion compensation device in accordance with the fourth embodiment of the present invention.
Figure 18:
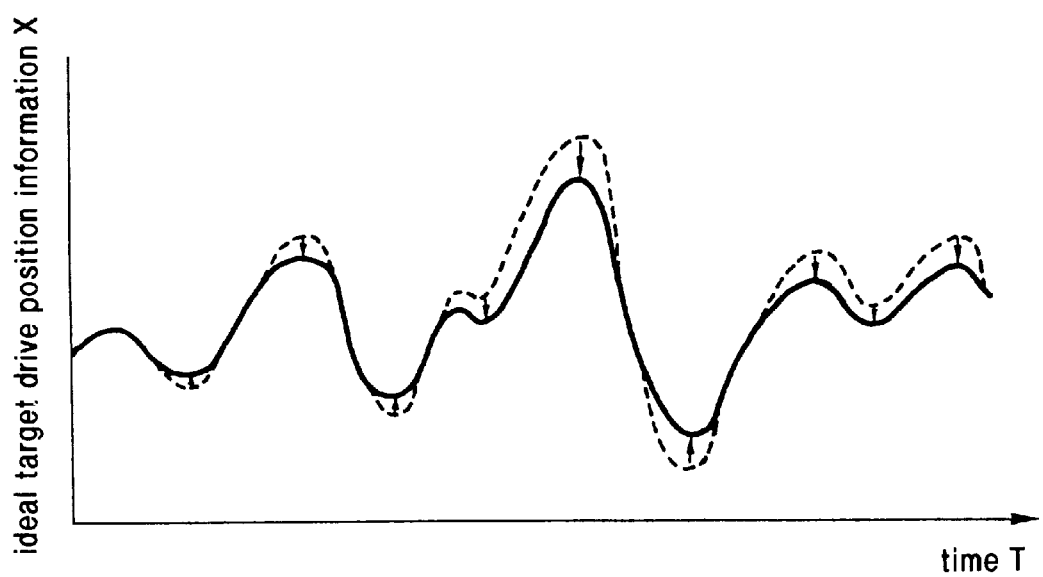
FIG. 18 is a graph of target drive position information corrected by the position bias table in the motion compensation device in accordance with the fourth embodiment of the present invention.

FIG. 17 is a diagram of the position bias table 561 in a motion compensation device in accordance with the fourth embodiment of the present invention. FIG. 18 is a graph showing the target drive position information corrected by the position bias table 561 in the motion compensation device in accordance with the fourth embodiment of the present invention.

As shown in FIG. 17, the position bias table 561 does not generate an output signal when the position detection information x of the motion compensation lens 10 exceeds −x1 and is less than x1. On the other hand, when the position detection information x of the motion compensation lens 10 is greater than −L and less than −x1, or greater than x1 and less than L, the position bias table 561 generates an output signal as shown in FIG. 17. As shown in FIG. 16, the output signal of the position bias table 561 is subtracted from the target drive position information X. As a result, as shown in FIG. 18, when large target drive position information X (dotted line FIG. 18) is input, the target drive position information X is distorted to correspond to the full line in FIG. 18, and is such that sudden speed changes of the motion compensation lens 10 do not occur. Moreover, even if the motion compensation lens 10 collides with a mechanical limit, the photographer is not conscious of any unnatural movement of the image in the viewfinder 100a. The target drive position information X', which is the target drive position information X from which the output signal of the position bias table 561 has been subtracted, is input to the movable range limiter 55, and the target drive position information X' passed through the movable range limiter 55 is input to the PID control unit 58.

When the motion compensation lens 10 is driven, centered on a position biased from the center of the range of movement of the compensation lens 10, the speed bias table 571 restores the motion compensation lens 10 to the center of the range of movement of the motion compensation lens 10, or to a neighborhood of the center of the range of movement of the motion compensation lens 10, correcting the drive speed of the motion compensation lens 10.

Figure 19:
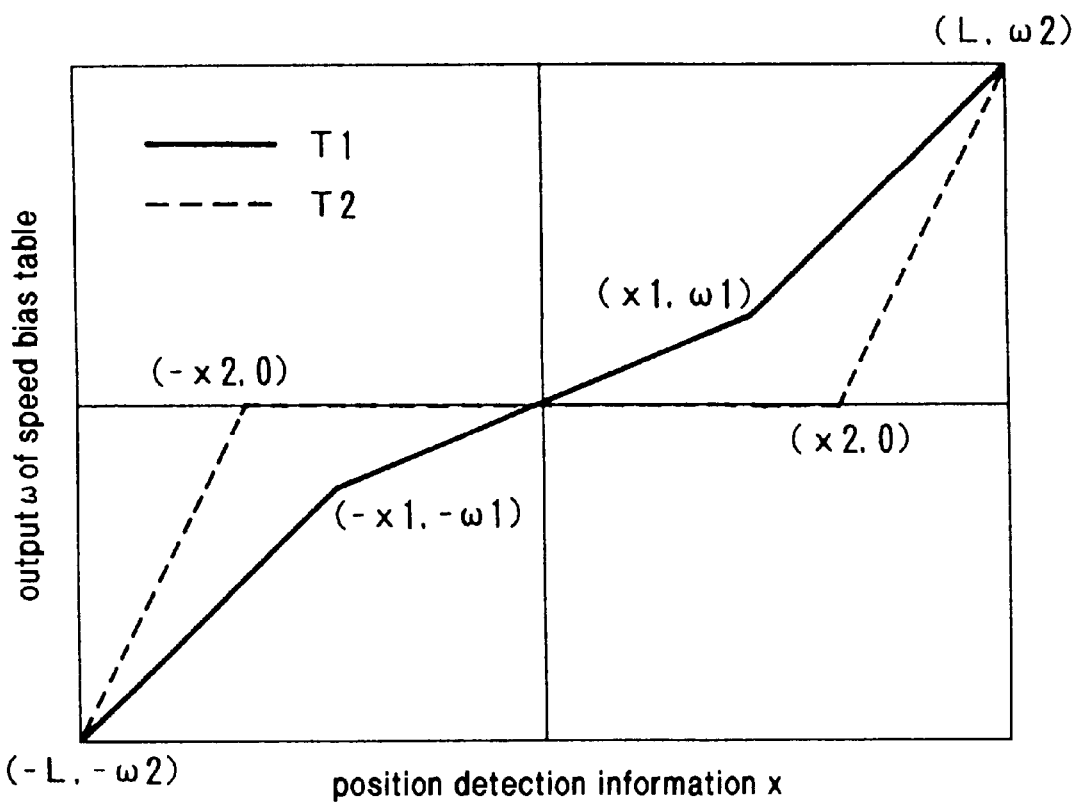
FIG. 19 is a diagram of a speed bias table of the motion compensation device in accordance with the fourth embodiment of the present invention.
Figure 20:
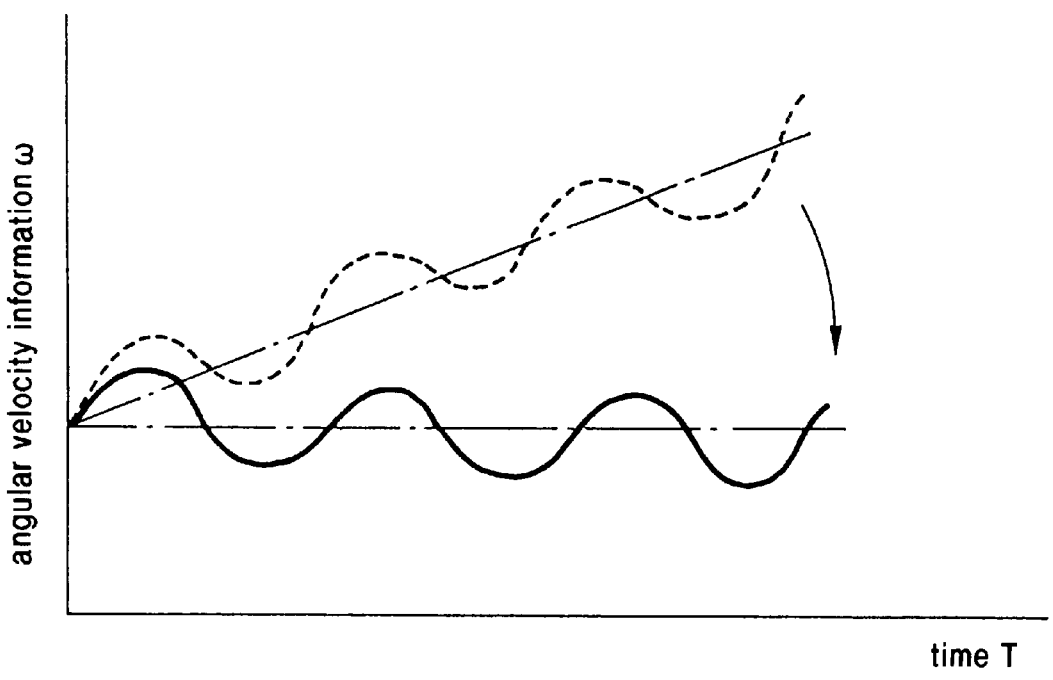
FIG. 20 is a graph of target drive position information corrected by the speed bias table in a motion compensation device in accordance with the fourth embodiment of the present invention.

FIG. 19 is a diagram of speed bias table 571 in a motion compensation device in accordance with the fourth embodiment of the present invention. FIG. 20 is a graph showing the target drive position information corrected by the speed bias table 571 in the motion compensation device in accordance with the fourth embodiment of the present invention.

As shown in FIG. 19, the speed bias table 571 comprises two types of tables, a large restoring amount (correction amount) table T1 and a small restoring amount (correction amount) table T2. In the case that the speed bias table 571 is changed to the table T1, when the position detection information x of the motion compensation lens 10 exceeds −x1 and is less than x1, the speed bias table 571 generates the output signal=$(\omega 1/x1) * x$. On the other hand, when the position detection information x is greater than −L and less than −x1, or is greater than x1 and less than L, the speed bias table 571 generates an output as shown in FIG. 19.

In the case that the speed bias table 571 is changed to the table T2, the speed bias table 571 does not generate an output signal when the position detection information x of the motion compensation lens 10 exceeds −x2 and is less than x2. On the other hand, when the position detection information x is greater than −L and less than −x2, or greater than x2 and less than L, the speed bias table 571 generates an output as shown in FIG. 19.

As shown in FIG. 16, the output signal of the position bias table 561 is subtracted from the angular velocity information ω. As a result, as shown in FIG. 20, the motion compensation lens 10 is driven centrally at an inclined position from the center of the range of movement, and the angular velocity information 03, corrected such as the full line FIG. 20, is restored to the center of the range of movement of the motion compensation lens 10, or to a neighborhood of the center of the range of movement of the motion compensation lens 10.

Next, the operation of the motion compensation device in accordance with the fourth embodiment of the present invention will now be described below with reference to FIGS. 21 and 22.

Figure 21:
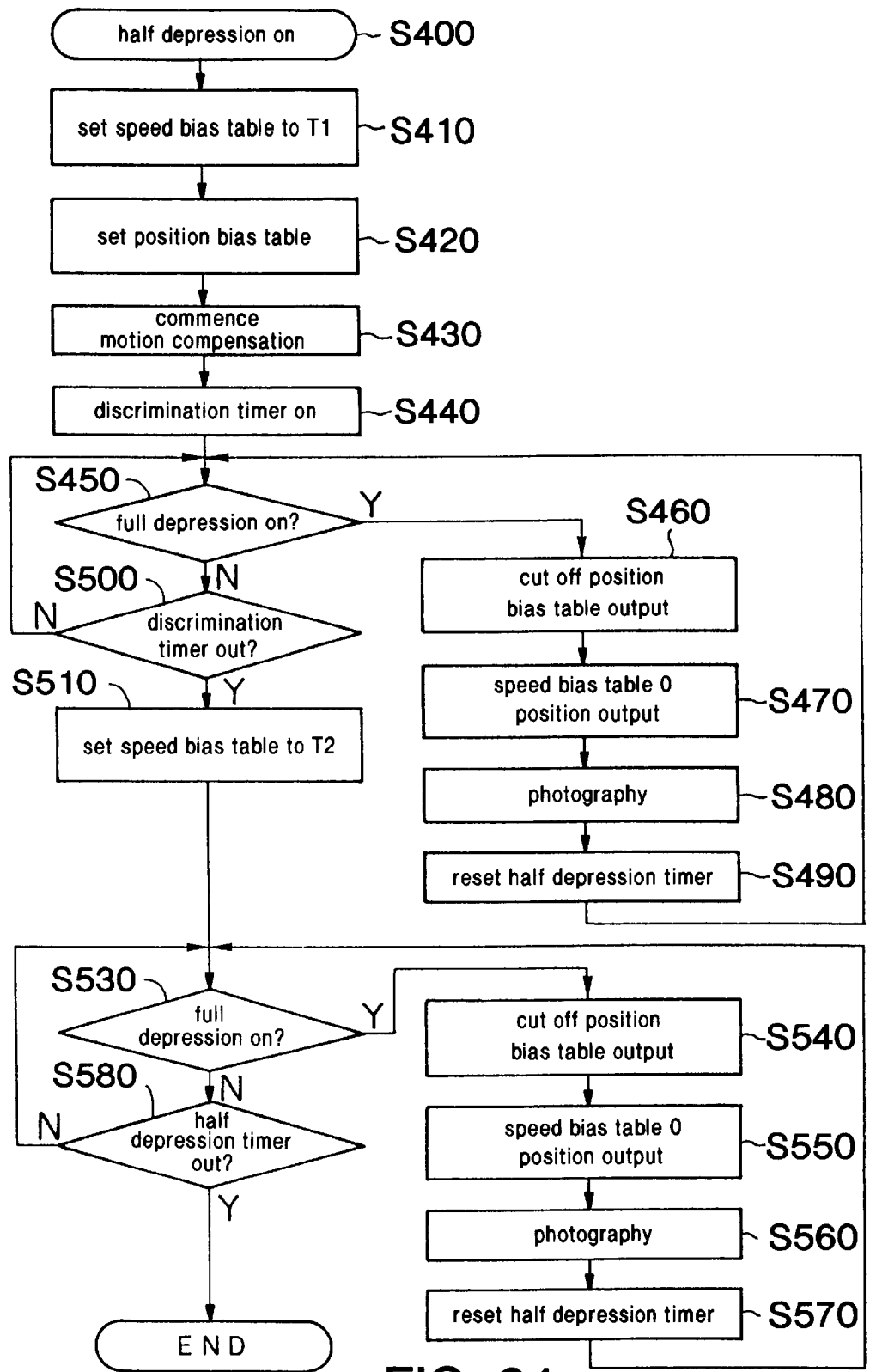
FIG. 21 is a flow chart illustrating an operational process for operating the motion compensation device in accordance with the fourth embodiment of the present invention.
Figure 22:
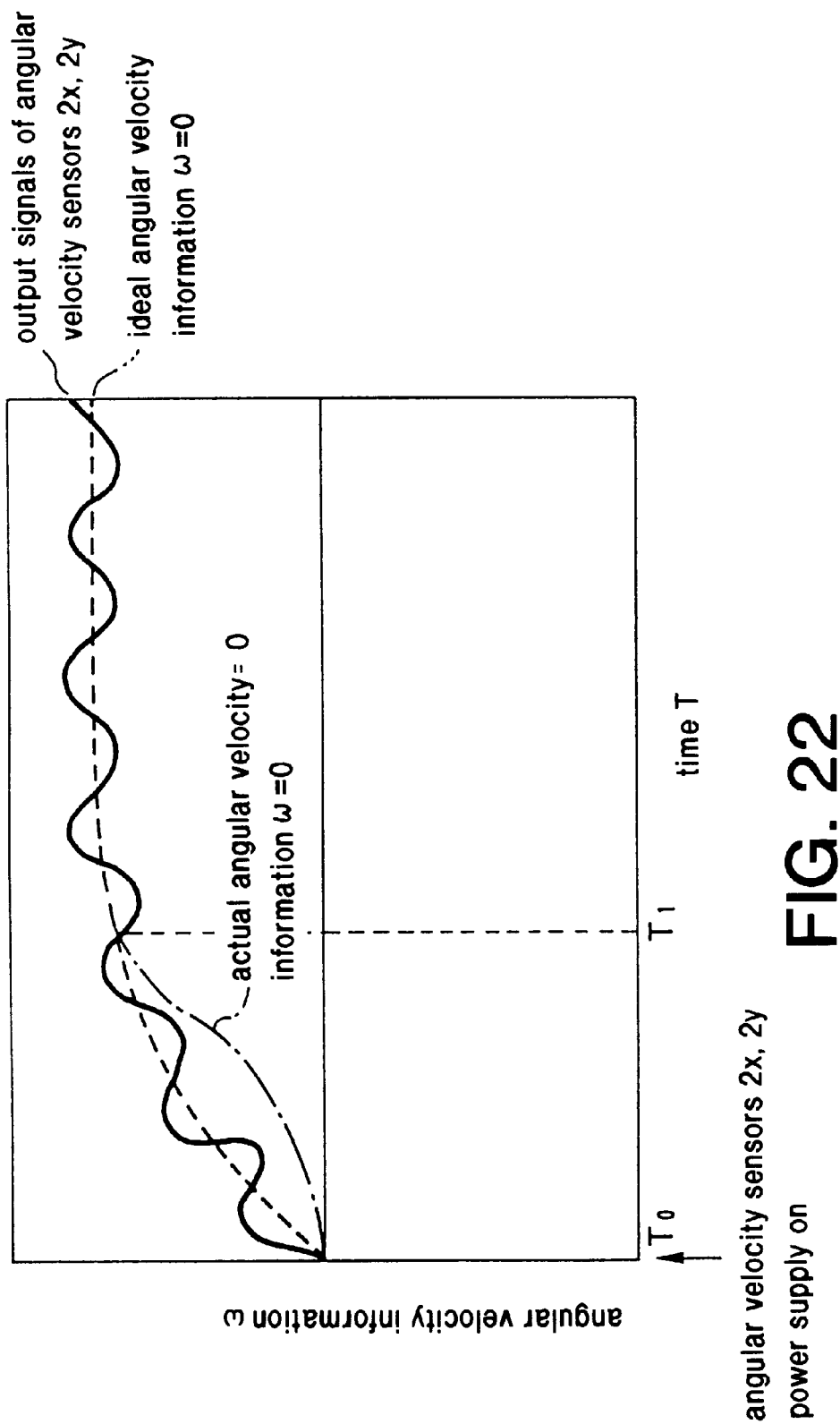
FIG. 22 is a diagram of an example of an output signal of an angular velocity sensor directly after the introduction of a power supply in accordance with embodiments of the present invention.

FIG. 21 is a flow chart illustrating an operational process for performing motion compensation with the motion compensation device in accordance with the fourth embodiment of the present invention. FIG. 22 is a diagram of an example of the output signal of an angular velocity sensor directly after the introduction of a power supply.

The operational process shown in the flowchart of FIG. 21 begins in S400 when the half depression switch is actuated ON. When the release switch 60 is actuated to half-depression, the main CPU 6 outputs motion compensation commencement signals to the motion compensation CPUs 5x, 5y, and power supply provision units (not shown in the figure) provide a power supply to the angular velocity sensors 2x, 2y. Moreover, the main CPU 6 actuates the half-depression timer 65 ON simultaneously with the half-depression operation of the release switch 60. In S410, the speed bias table 571 is set to the table T1. As shown in FIG. 22, from the time $T_0$ to the time $T_1$ directly after the introduction of a power supply, the output signals of the angular velocity sensors 2x, 2y are not stable.

When the restoring amount of the speed bias table 571 is small, the motion compensation lens 10 receives drift effects, unchanged toward one side of the range of movement of the motion compensation lens 10, and there is a possibility that the motion compensation lens 10 does not return to the center of the range of movement until the drift effects settle down. Therefore, the motion compensation CPUs 5x, 5y set the speed bias table 571 to the large restoring amount table T1. Because of this, as shown in FIG. 20, the speed bias table 571 restores the motion compensation lens 10 to the center or to neighborhood of the center of the range of movement of the motion compensation lens 10 according to the separation of the motion compensation lens 10 from the center of the range of movement of the motion compensation lens 10. As a result, the angular velocity sensors 2x, 2y can follow the drift.

In S420, the position bias table 561 is set. Specifically, after the speed bias table 571 has been set to the table T1, the motion compensation CPUs 5x, 5y set the position bias table 561.

In S430, motion compensation commences. The motion compensation CPUs 5x, 5y commence a series of motion compensation operations based on the motion compensation commencement signal of the lens CPU 7. The motion compensation CPUs 5x, 5y, calculate the target drive position information X with the ideal target position conversion unit 53, based on the angular velocity information output by the angular velocity sensors 2x, 2y, and based on the target drive position information X, drive control the VCMs 3x, 3y.

In S440, the discrimination timer 64 is actuated ON. The discrimination timer 64 is actuated ON simultaneously with the half-depression actuation of the release switch 60. In accordance with the fourth embodiment of the present invention, the discrimination timer 64 is preferably set to about 1–5 seconds to allow stabilization of the angular velocity sensors 2x, 2y.

In S450, it is determined whether or not the full-depression switch of the release switch 60 has been actuated ON. The main CPU 6 monitors whether or not full-depression actuation of the release switch 60 occurs. When full-depression of the release switch 60 occurs, the operational process proceeds to S460, and when full-depression of the release switch 60 has not been actuated, the operational process proceeds to S500.

In S460, the output of the position bias table 561 is cut off. In a case in which the position bias table 561 is used at exposure time (photographic operation time), and the position detection information as shown in FIG. 17 is greater than x or less than −x, there is a possibility that the target drive position information X will distort as shown in FIG.

18, and have detrimental effects on the photograph. In response to the full-depression actuation of the release switch 60, the main CPU 6 instructs the output cutoff of the position bias table 561 to the motion compensation CPUs 5x, 5y. As a result, the position bias table output signal is cut off and the target drive position information X is not corrected.

In S470, the speed bias table 571 is held at the zero (0) position output. As shown in FIG. 20, the motion compensation lens 10 is driven based on the distorted angular velocity information w in accordance with the effect of the strong speed bias by the speed bias table 571. Because of this, when photography is performed in this state, there is a possibility that the photographic result will be poor. Therefore, in response to the full-depression actuation of the release switch 60, the main CPU 6 instructs the motion compensation CPUs 5x, 5y to hold the speed bias table 571 in the zero (0) position output. As a result, the speed bias table 571 maintains the output signal of the speed bias table 571 as an output signal according to the amount of correction (restoration amount) when the motion compensation lens 10 is at the optical axis, which is the center of the range of movement of the motion compensation lens 10, or in a neighborhood of the center of the range of movement of the motion compensation lens 10.

In S480, photography is performed. The main CPU 6 instructs the mirror drive unit 14 to raise the mirror 140, and the quick return mirror 140 moves from within the photographic light path to the position shown by dotted lines in FIG. 15. Then, in S490, the half-depression timer 65 is reset.

In S500, it is determined whether or not the discrimination timer 64 has timed out. When the discrimination timer 64 has timed out, the operational process proceeds to S510, and if the discrimination timer 64 has not timed out, the operational process returns to S450, and the determination of whether or not the full-depression switch of the release switch 60 has been actuated ON is repeated.

In S510, the speed bias table 571 is set to table T2. Before the release switch 60 is actuated to full-depression, the angular velocity sensors 2x, 2y are considered to have stabilized when the half-depression timer 64 has timed out (time $T_1$ has elapsed). After the angular velocity sensors 2x, 2y have stabilized, when the speed bias table 571 is set to the large restoring amount table T1, there is a possibility that hand shake of the photographer will not be faithfully compensated. Therefore, the speed bias table 571 is changed from the large restoring amount table T1 to the small restoring amount table T2. As a result, because the amount of distortion of the target drive position information X becomes small, as shown in FIG. 18, the distortion of the image in the viewfinder 100a becomes small, and a motion compensation effect is obtained.

In S530, it is determined whether or not the full-depression switch of the release switch 60 has been actuated ON. After the speed bias table 571 is set to the table T2, when the release switch 60 is actuated to full-depression, in S540 the output signal of the position bias table 561 is cut off, and the speed bias table 571 is held at the zero (0) position output (S550). Then, in S560, a photographic operation is performed, and in S570 the half-depression timer 65 is reset.

On the other hand, after the speed bias table 571 has been set to the table T2 (S510), when the release switch 60 is not actuated to full-depression (S530), the operational process proceeds to S580, and it is determined whether or not the half-depression timer 65 has timed out. When the half-depression timer 65 has timed out, the main CPU 6 instructs the motion compensation CPUs 5x, 5y to stop driving of the motion compensation lens 10, and the operational process shown in FIG. 21 ends. When the half-depression timer 65 has not timed out, the operational process returns to S530.

In accordance with the fourth embodiment of the present invention, the discrimination timer 64 is actuated ON in response to the half-depression actuation of the release switch 60, the speed bias table 571 corrects the angular velocity information ω, and the position bias table 561 corrects the target drive position information X. As shown in FIG. 22, the output signal ω (angular velocity information) of the angular velocity sensors 2x, 2y has not stabilized directly after the introduction of a power supply, and in comparison with output signals due to hand shake, equal or greater drift arises. Because the angular velocity=0 algorithm 50 normally used in calculation of the value of the angular velocity information ω=0 is a robust filter of 1 Hz or less, the algorithm 50 cannot follow the drift. The amount of drift which is not followed is integrated by the integration unit 51, and used to drive the motion compensation lens 10 as target drive position information X. The speed bias table 561 corrects the value of the angular velocity information ω=0 according to the separation of the motion compensation lens 10 from the center of the range of movement of the motion compensation lens 10 to restore the motion compensation lens 10 to the center of the range of movement, and carries an auxiliary duty while calculating the value of the angular velocity information ω=0. By increasing the restoring amount by of the speed bias, the speed bias table 561 can follow the drift of the angular velocity sensors 2x, 2y.

Fifth Preferred Embodiment

Figure 23:
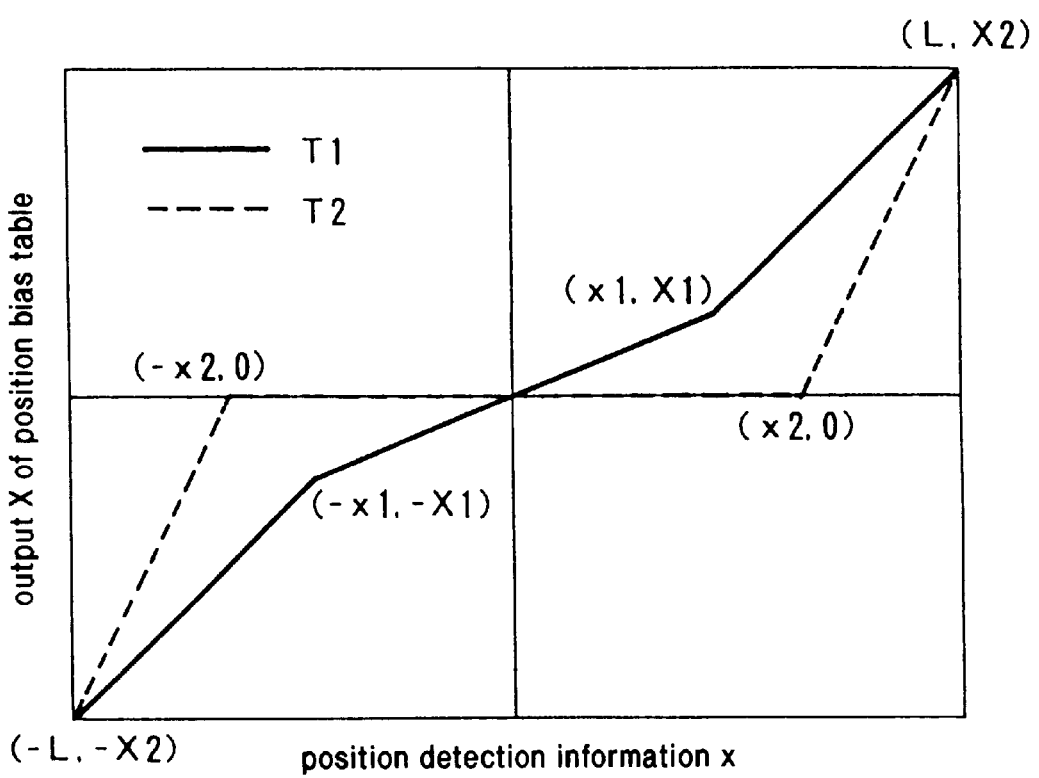
FIG. 23 is a diagram of a position bias table of the motion compensation device in accordance with the fourth embodiment of the present invention.

FIG. 23 is a diagram of a position bias table in a motion compensation device in accordance with the fifth embodiment of the present invention. The position bias table shown in FIG. 23 includes a large restoring amount table T1 and a small restoring amount table T2.

Figure 24:
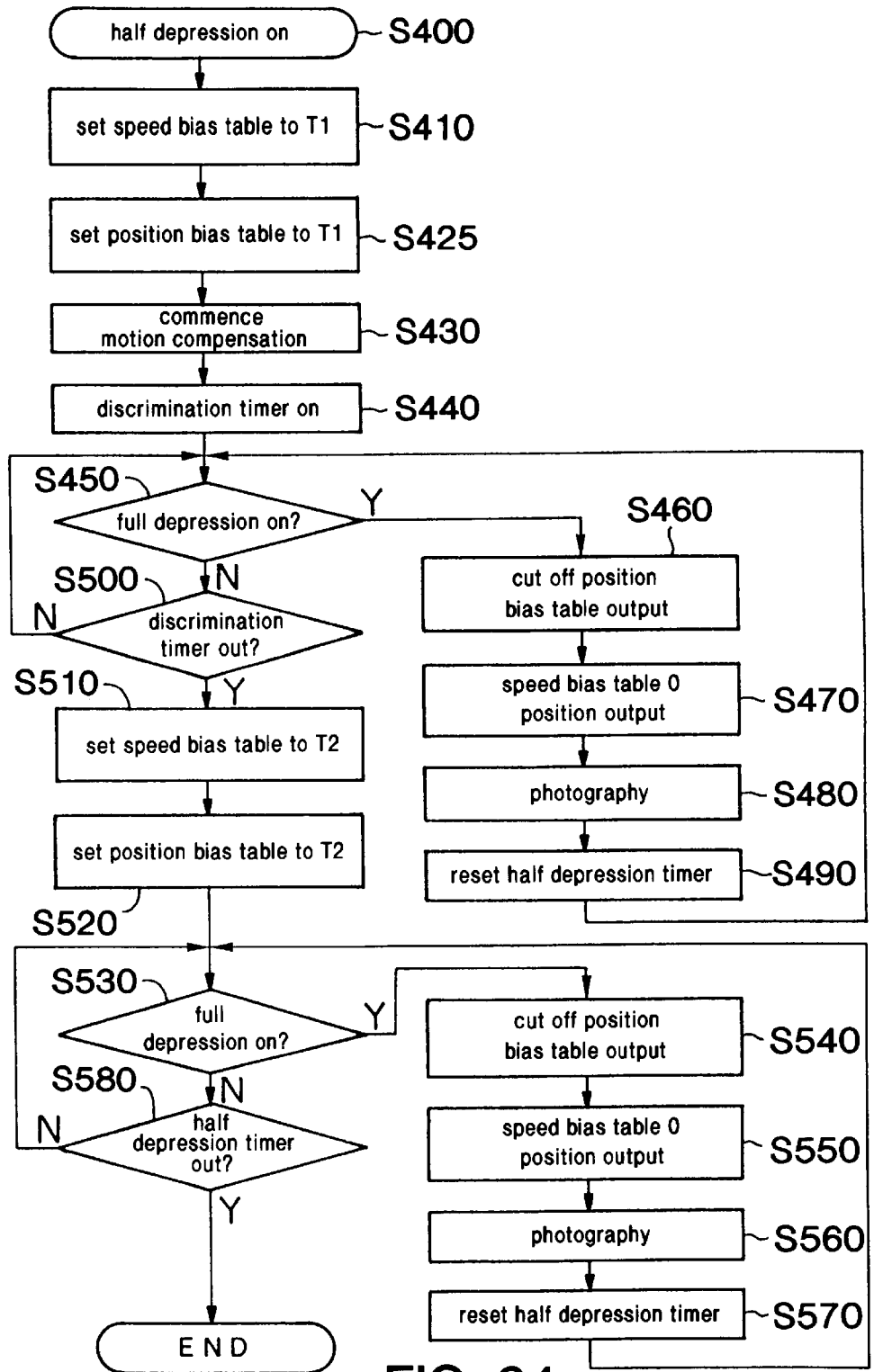
FIG. 24 is a flow chart illustrating the operation of a motion compensation device in accordance with a fifth embodiment of the present invention.

FIG. 24 is a flow chart illustrating an operational process for performing motion compensation with the motion compensation device in accordance with the fifth embodiment of the present invention. The steps shown in FIG. 24 which are the same as or similar to those shown in the flow chart of FIG. 21 are referred to by the same reference symbols, and a detailed description of these steps will not be repeated here.

The motion compensation device in accordance with the fifth embodiment of the present invention sets a speed bias table 571 to the large restoring amount table T1, and sets the position bias table 561 to the large restoring amount table T1 after a power supply has been introduced.

In S425, the position bias table 561 is set to the table T1. The motion compensation CPUs 5x, 5y set the position bias table 561 to the large restoring amount table T1 based on the motion compensation commencement signal from the main CPU 6. As a result, the motion compensation lens 10 can be positioned at the center of its range of movement, or in a neighborhood of the center of its range of movement.

In S520, the position bias table 561 is set to the table T2. After a predetermined time has elapsed after the introduction of a power supply, and the discrimination timer 64 has timed out, the motion compensation CPUs 5x, 5y change the position bias table 561 from the large restoring amount table T1 to the small restoring amount table T2. As a result, the distortion of the target drive position information X becomes small, and an image can be obtained with small distortion in the viewfinder 100a.

In accordance with the fifth embodiment of the present invention, by setting the large restoring amount table T1 after the introduction of a power supply, the motion compensation lens 10 can be positioned in the center of its range of movement, or in a neighborhood of the center of its range of movement. As a result, the effect of the drift of the angular velocity sensors 2x, 2y can be reduced.

Sixth Preferred Embodiment

Figure 25:
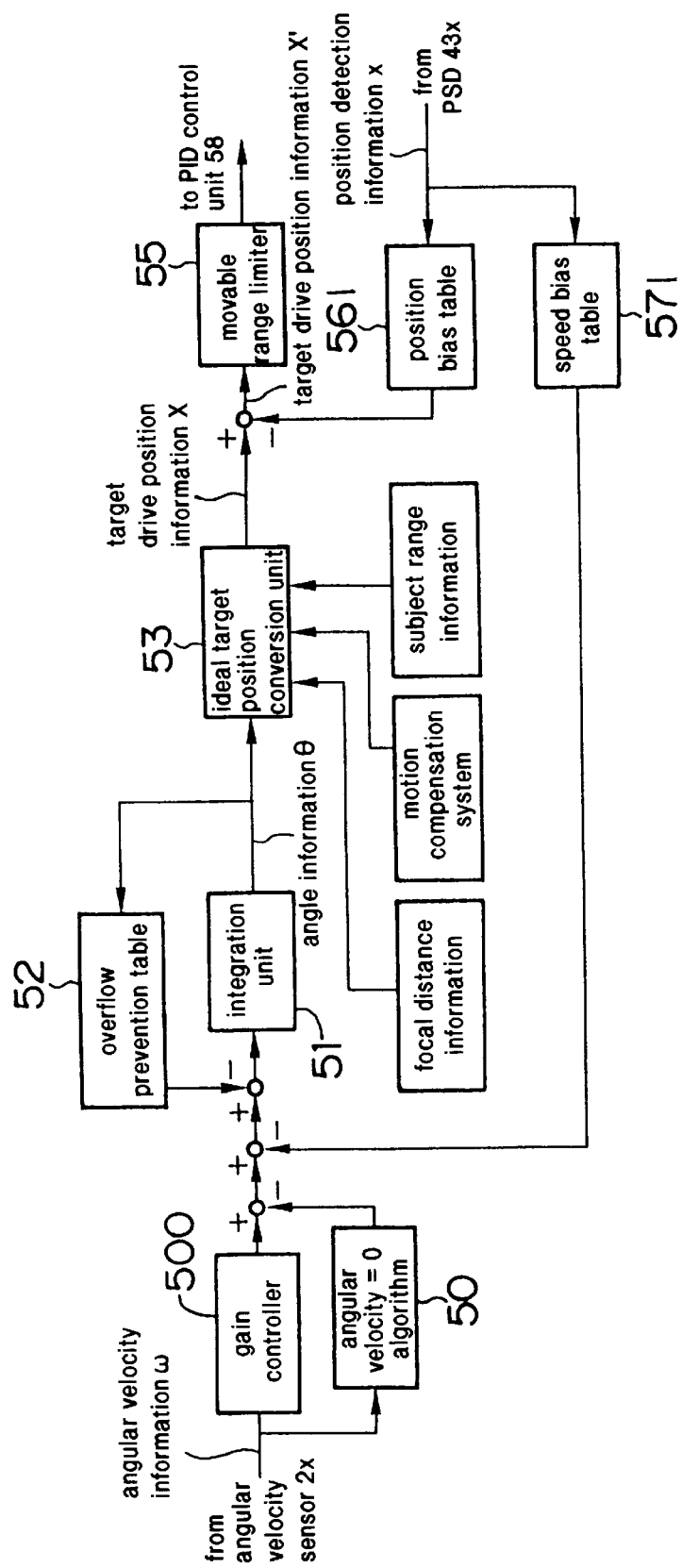
FIG. 25 is a block diagram of a calculation unit of a motion compensation.CPU in the motion compensation device in accordance with the fifth embodiment of the present invention.

FIG. 25 is a block diagram of a calculation unit of a motion compensation CPU in a motion compensation device in accordance with a sixth embodiment of the present invention.

As shown in FIG. 25, the motion compensation device in accordance with the sixth embodiment of the present invention includes a gain controller 500 which varies an output signal ω (angular velocity information) of the angular velocity sensor 2x. The gain controller 500 reduces the gain of the input angular velocity information ω. The angular velocity information which is compensated is found by subtracting the output signal of the angular velocity=0 algorithm 50 from the output signal of the gain controller 500.

Figure 26:
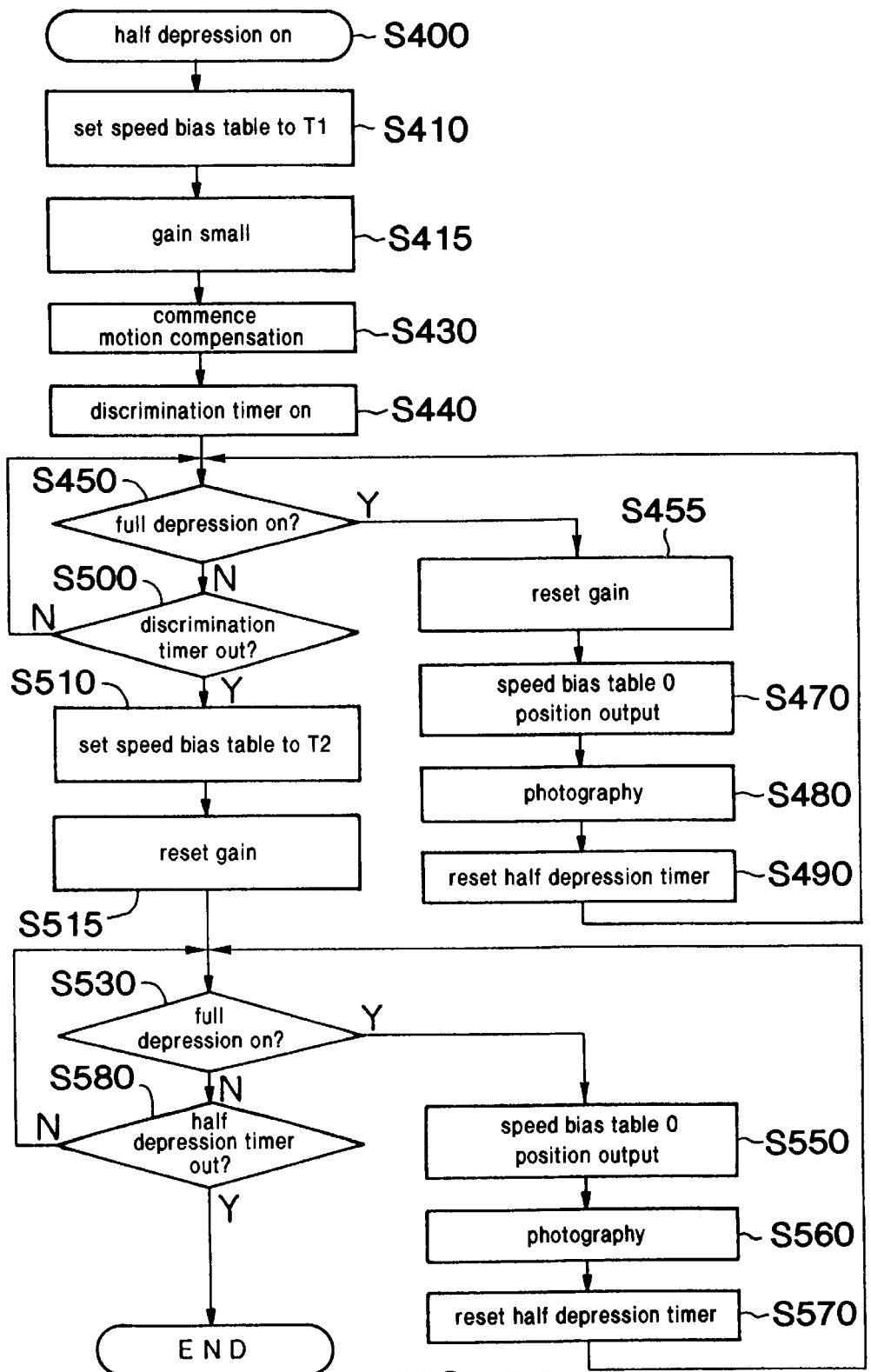
FIG. 26 is a flow chart illustrating an operational process for operating a motion compensation device in accordance with a sixth embodiment of the present invention.

FIG. 26 is a flow chart illustrating an operational process for performing motion compensation with a motion compensation device in accordance with the sixth embodiment of the present invention. Furthermore, the steps shown in FIG. 26 which is the same as or similar to those shown in FIG. 21 are referred to by the same reference symbols, and a detailed description of these like steps will not be repeated here.

In S400, after a power supply has been introduced to the angular velocity sensors 2x, 2y, in S410 the speed bias table 571 is set to the large restoring amount table T1. Then, in S415, the motion compensation CPUs 5x, 5y reduce the gain of the gain controller 500 from an initially set value to set a small gain. As a result, the effect of drift is slight, and the motion compensation lens 10 can be positioned in the center of its range of movement, or in a neighborhood of the center of its range of movement.

In S430, after motion compensation has commenced, in S450 it is determined whether the release switch 60 has been actuated to full-depression. If the release switch 60 has been actuated to full-depression, in S455 the motion compensation CPUs 5x, 5y return the gain of the gain controller 500 to the initially set value. Then, in S470, the speed bias table 571 is held at the zero (0) position output, and in S480 photography is performed.

When it is determined in S450 that the release switch 60 has not been actuated to full-depression, it is determined in S500 that the discrimination timer times out, and when the output of the angular velocity sensors 2x, 2y has stabilized, in S515 the motion compensation CPUs 5x, 5y return the gain of the gain controller 500 to the initially set value. As a result, the motion compensation device can be reset to a normal motion compensation operation.

The motion compensation device in accordance with the sixth embodiment of the present invention includes a gain controller 500 which varies the output signal of the angular velocity sensor 2x. When the gain controller 500 reduces the gain of the angular velocity information ω by an extreme amount, the angular velocity information which is compensated becomes equal to the output signal of the angular velocity=0 algorithm 50, and the motion compensation lens 10 is driven based on the output signal of the angular velocity=0 algorithm 50. Because of this, no motion compensation effect can be obtained in the viewfinder 100a, and the motion compensation lens 10 can be kept stabilized for there to be no signal due to hand shake. As a result, no effect of drift of the angular velocity sensors 2x, 2y is received, and the motion compensation lens 10 can be kept in the center of its moveable range, or in a neighborhood of the center of its moveable range, by the speed bias table 571. Moreover, at the time of exposure, because the gain returns to the initially set value, a motion compensation photograph is obtained.

The present invention is not limited to the embodiments described hereinabove, and various modifications are possible.

For example, in accordance with embodiments of the invention described hereinabove, the overflow prevention table 52, position bias tables 56, 561 and the speed bias tables 57, 570, 571, shown in FIGS. 4, 6, 12, 14, 17, 19 and 23, are all discontinuous tables. However, the present invention is not limited to discontinuous tables and similar effects can be obtained by polynomial calculations. Furthermore, there is no limitation to the position bias tables 56, 561 and the speed bias tables 57, 570, 571, shown in FIGS. 6, 12, 14, 17, 19 and 23, and the motion compensation range of the table T2 may be configured to be wider than the motion compensation range of the table T1.

Still further, in accordance with the preferred embodiments of the present invention described hereinabove, the position bias tables 56, 561 and the speed bias tables 57, 570, 571 respectively use two (2) tables, table T1 and table T2. However, the present invention is not limited to using two tables for the position bias tables and the speed bias tables, and three (3) or more tables may be incorporated in the speed bias tables and the position bias tables with multiple comparison values.

Effects using both sides or only one side can be obtained with the position bias tables 56, 561 and the speed bias tables 57, 570, 571.

The first through third embodiments of the present invention may be such that at the time of exposure, the output signal of the position bias table 56 does not correct the target drive position information X.

In accordance with the first through third embodiments of the present invention, the comparator 54 compares the target drive position information X and the comparison values $X_{max}$, $X_{min}$. However, the present invention is not limited to this type of comparison, and the changeover of the tables T1 and T2 may be based on the result of a comparison of the output signals of the angular velocity sensors 2x, 2y and the comparison values $X_{max}$, $X_{min}$.

In accordance with the first through third embodiments of the present invention, the determination of whether vibration is due to panning or composition change, or whether vibration is due to hand shake, is made based on the angular velocity information ω or the target drive position information X. However, the changeover of the table T1 and the table T2 may also be made based on the result of this determination.

In accordance with the fourth through sixth embodiments of the present invention, during a time of photographic operation, the position bias table 571 is held at the zero (0) position output. However, a changeover to the small restoring amount table may be made to the extent that there are no detrimental effects on the photographic result.

In accordance with fourth through sixth embodiments of the present invention, the angular velocity sensors 2x, 2y are actuated at commencement of the power supply, and when the motion compensation lens 10 is driven at half-depression actuation of the release switch 60, the speed bias table 571 may be set to the large restoring amount table T1 after half-depression actuation.

The first through sixth embodiments of the present invention have been described hereinabove with respect to application of the motion compensation device to a single lens reflex camera. However, the present invention is not limited to application to a single lens reflex camera and can also be applied to a video camera, binoculars, and the like.

Although a few preferred embodiments of the present invention have been shown and described, it will be appreciated by those skilled in the art that changes may be made in these embodiments without departing from the principles and spirit of the invention, the scope of which is defined in the claims and their equivalents.

What is claimed is:

1. A motion compensation device, comprising:
   a motion detection unit to detect motion and to output a motion detection signal representing the detected motion;
   a motion compensation optical system to correct motion;
   a drive unit to drive the motion compensation optical system;
   a position detection unit to detect a position of the motion compensation optical system and to output a position detection signal representing the detected position;
   a target drive position calculating unit to calculate a target drive position of the motion compensation optical system based on the motion detection signal, and to output a target drive position signal; and
   a target drive position signal correction unit to correct the target drive position signal based on the position detection signal, to bias drive the motion compensation optical system toward a center of a drive range of the motion compensation optical system,
   wherein the target drive position signal correction unit reduces a correction value for the target drive position signal when the position detection signal exceeds a predetermined value.

2. A motion compensation device as recited in claim 1, wherein
   the predetermined value has a maximum value and a minimum value, and the target drive position signal correction unit reduces the correction value, when the target drive position signal exceeds the maximum value and is less than the minimum value between a predetermined time.

3. A motion compensation device as recited in claim 1, wherein
   the target drive position signal correction unit reduces the correction value during a photographic operation.

4. A motion compensation device as recited in claim 1, further comprising:
   a control unit to perform drive control of the drive unit based on the target drive position signal corrected by the target drive position signal correction unit, wherein the control unit controls the drive unit to drive the motion compensation optical system to a center, or a neighborhood of the center, of a drive range of the motion compensation optical system, when an amount of correction of the target drive position signal is large.

5. A motion compensation device as recited in claim 1, wherein an amount of correction of the target drive position signal by the target drive position signal correction unit at the time of a photographic operation is small.

6. A motion compensation device as recited in claim 1, further comprising:
   a comparison unit to compare the position detection signal and the predetermined value,
   wherein the target drive position signal correction unit makes the correction value of the target drive position signal small based on a comparison result of the comparison unit.

7. A motion compensation device as recited in claim 6, wherein
   the predetermined value comprises a maximum value and a minimum value and when the position detection signal exceeds the maximum value within a predetermined time, and is less than the minimum value, the target drive position signal correction unit makes the correction amount small.

8. A motion compensation device as recited in claim 7, wherein
   the target drive position signal correction unit resets the correction value, after the correction value is changed, and the position detection signal does not exceed the maximum value within the predetermined time, and is not below the minimum value.

9. A motion compensation device, comprising:
   a motion detection unit to detect motion and to output a motion detection signal;
   a motion compensation optical system to compensate for the detected motion;
   a drive commencement signal generating unit to generate a drive commencement signal to drive the motion compensation optical system;
   a drive unit to drive the motion compensation optical system based on the drive commencement signal;
   a position detection unit to detect a position of the motion compensation optical system and to output a position detection signal representing the detected position;
   a target drive position calculating unit to calculate a target drive position of the motion compensation optical system based on the motion detection signal, and to output a target drive position signal; and
   a target drive position signal correction unit to correct the target drive position signal based on the position detection signal, to bias drive the motion compensation optical system toward a center of a drive range of the motion compensation optical system,
   wherein the target drive position signal correction unit reduces a correction value for the target drive position signal after a predetermined time has elapsed from the generation of the drive commencement signal.

10. A motion compensation device as recited in claim 9, wherein
    the target drive position signal correction unit reduces the correction value during a photographic operation.

11. A motion compensation device as recited in claim 9, further comprising:
    a control unit to control the drive unit based on the target drive position signal corrected by the target drive position signal correction unit,
    wherein the control unit controls driving of the motion compensation optical system by the drive unit to a center, or a neighborhood of the center, of a drive range of the motion compensation optical system at a predetermined time from the generation of the drive commencement signal.

12. A motion compensation device as recited in claim 10, wherein
    the target drive position signal correction unit maintains a correction amount of the target drive position signal at a correction amount when the motion compensation optical system is in a center or a neighborhood of the center of a movable range at a time of a photographic operation.

13. A motion compensation device as recited in claim 10, wherein the target drive position signal correction unit does not correct the target drive position signal during a time of photographic operation.

14. A motion compensation device, comprising:
a motion detection unit to detect motion and to output a motion detection signal;
a gain varying unit to vary a gain of the motion detection signal;
a motion compensation optical system to correct motion;
a drive commencement signal generating unit to generate a drive commencement signal to drive the motion compensation optical system;
a drive unit to drive the motion compensation optical system based on the drive commencement signal; and
a position detection unit to detect a position of the motion compensation optical system and to output a position detection signal representing the detected position,
wherein the gain varying unit makes the gain of the motion detection signal small at a predetermined time from the generation of the drive commencement signal.

15. A motion compensation device as recited in claim 14, wherein
the gain varying unit resets the gain of the motion detection unit at a time of photographic operation.

16. A motion compensation device, comprising:
a motion detection unit to detect motion causing image blur and to output a motion detection signal;
a motion compensation optical system to compensate for the motion causing image blur;
a drive commencement signal generation unit to generate a drive commencement signal to drive the motion compensation optical system;
a drive unit to drive the motion compensation optical system based on the drive commencement signal;
a position detection unit to detect a position of the motion compensation optical system and to output a position detection signal;
a target drive position calculation unit to calculate a target drive position of the motion compensation optical system based on the motion detection signal, and to output a target position signal; and
a target position signal correction unit to correct the target position signal at a predetermined time from the generation of the drive commencement signal, based on the position detection signal.

17. A motion compensation device as recited in claim 16, wherein
the target position signal correction unit corrects a drive position of the motion compensation optical system.

18. A motion compensation device as recited in claim 16, further comprising:
a control unit to control the drive unit based on the target position signal corrected by the target position signal correction unit,
wherein the control unit, at a predetermined time from the generation of the drive commencement signal, controls driving of the motion compensation optical system by the drive unit in a center or a neighborhood of the center of a movement range of the motion compensation optical system.

19. A motion compensation device as recited in claim 17, wherein
the target position signal correction unit does not correct the motion detection signal during a photographic operation.

20. A motion compensation device as recited in claim 16, further comprising:
a gain varying unit to vary a gain of the motion detection signal,
wherein the gain varying unit makes the gain of the motion detection signal small between a predetermined time from the generation of the drive commencement signal.

21. A motion compensation device as recited in claim 20, wherein
the gain varying unit resets the gain of the motion detection unit during a photographic operation.

22. A motion compensation device, comprising:
a motion detection unit to detect motion causing image blur and to output a motion detection signal;
a motion compensation optical system to compensate for the motion causing image blur;
a drive commencement signal generation unit to generate a drive commencement signal;
a drive unit which to drive the motion compensation optical system based on the drive commencement signal;
a target drive position calculation unit to calculate a target drive position of the motion compensation optical system based on the motion detection signal, and to output a target position signal; and
a target position signal correction unit to correct the target position signal based on the position detection signal at a predetermined time from the generation of the drive commencement signal.

23. A motion compensation device as recited in claim 22, wherein
the target position signal correction unit corrects a drive position of the motion compensation optical system.

24. A motion compensation device as recited in claim 22, further comprising:
a control unit to drive control the drive unit based on the target position signal corrected by the target position signal correction unit;
wherein the control unit controls driving of the motion compensation optical system by the drive unit to a center or a neighborhood of the center of a movement range of the motion compensation optical system at a predetermined time from the generation of the drive commencement signal.

25. A motion compensation device as recited in claim 23, wherein
the target position signal correction unit does not correct the motion detection signal during a photographic operation.

26. A motion compensation device as recited in claim 22, further comprising:
a gain varying unit to vary the gain of the motion detection signal;
wherein the gain varying unit makes the gain of the motion detection signal small between a predetermined time from the generation of the drive commencement signal.

27. A motion compensation device as recited in of claim 26, wherein
the gain varying unit resets the gain of the motion detection unit during a photographic operation.

* * * * *